(12) United States Patent
Wehrmeister et al.

(10) Patent No.: US 10,740,330 B2
(45) Date of Patent: Aug. 11, 2020

(54) MULTI-PLATFORM OPTIMIZATION

(71) Applicant: TERADATA US, INC., Dayton, OH (US)

(72) Inventors: Robert Matthew Wehrmeister, Austin, TX (US); Awny Kayed Al-Omari, Cedar Park, TX (US); Kashif Abdullah Siddiqui, Round Rock, TX (US)

(73) Assignee: Teradata US, Inc., San Diego, CA (US)

( * ) Notice: Subject to any disclaimer, the term of this patent is extended or adjusted under 35 U.S.C. 154(b) by 135 days.

(21) Appl. No.: 14/206,090

(22) Filed: Mar. 12, 2014

(65) Prior Publication Data

US 2014/0317085 A1    Oct. 23, 2014

Related U.S. Application Data

(60) Provisional application No. 61/786,337, filed on Mar. 15, 2013, provisional application No. 61/787,036, filed on Mar. 15, 2013.

(51) Int. Cl.
*G06F 16/2453* (2019.01)

(52) U.S. Cl.
CPC .. *G06F 16/24542* (2019.01); *G06F 16/24544* (2019.01)

(58) Field of Classification Search
CPC ............... G06F 17/30463; G06F 16/24542
See application file for complete search history.

(56) References Cited

U.S. PATENT DOCUMENTS

| 6,438,741 | B1 * | 8/2002 | Al-omari | G06F 17/30463 |
| | | | | 707/694 |
| 2006/0136368 | A1 * | 6/2006 | Young-Lai et al. | 707/2 |
| 2013/0346390 | A1 * | 12/2013 | Jerzak et al. | 707/719 |

OTHER PUBLICATIONS

D. Kossmann, "The State of the Art in Distributed Query Processing", 2000, ACM, pp. 226-228.*

* cited by examiner

*Primary Examiner* — Apu M Mofiz
*Assistant Examiner* — Sheryl L Holland
(74) *Attorney, Agent, or Firm* — Ramin Mahboubian

(57) ABSTRACT

The execution of the one or more database queries can be optimized by using a multi-platform cost model that take into account the respective cost of execution in each one of the multiple execution platforms. The respective costs of the execution can, for example, include cost associated with one or more operators for executing the one or more database queries in each one of the multiple execution platforms and/or the costs of exchanging data between the multiple execution platforms.

7 Claims, 18 Drawing Sheets

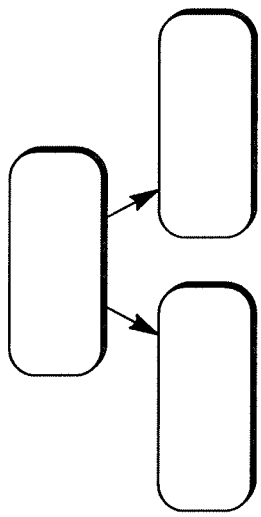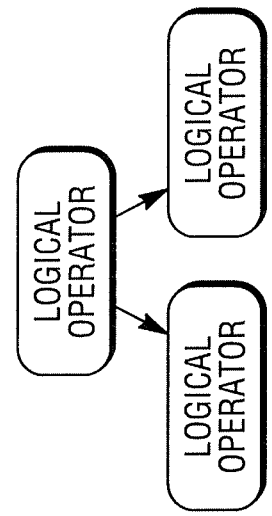
FIG. 6
FIG. 7
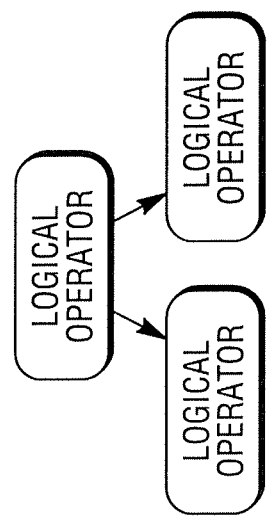

OPTIMIZER TASK STATE TRANSITION DIAGRAM

MULTI-PLATFORM OPTIMIZATION

CROSS-REFERENCE TO THE RELATED APPLICATIONS

This application takes priority from the Provisional U.S. Patent Application No. 61/786,337, entitled: "Optimization Engine," by Awny Al-Omani et al., filed on Mar. 15, 2013, which is hereby incorporated by reference herein in its entirety.

This application also takes priority from the Provisional U.S. Patent Application No. 61/787,036, entitled: "MULTI-PLATFORM OPTIMIZATION," by Robert Wehrmeister et al., filed on Mar. 15, 2013, which is also hereby incorporated by reference herein in its entirety.

This application is related to the U.S. patent application Ser. No. 14/206,045 by Awny Al-Omani et al., which is hereby incorporated by reference herein in its entirety.

This application is related to the U.S. patent application Ser. No. 14/206,070 by Awny Al-Omani et al., which is hereby incorporated by reference herein in its entirety.

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases provide a very good example of a computing environment or system where the storage of data can be crucial. As such, to provide an example, databases are discussed below in greater detail.

The term database can also refer to a collection of data and/or data structures typically stored in a digital form. Data can be stored in a database for various reasons and to serve various entities or "users." Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations, larger user communities, or device populations. Larger databases can be supported by relatively larger capacities, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

In view of the prevalence of databases in various aspects life today and importance of optimization of database queries, it is apparent that techniques for optimization of database queries are very useful.

SUMMARY

Broadly speaking, the invention relates to computing environments and systems. More particularly, the invention relates to summarizing information for databases.

In accordance with one aspect, the execution of the one or more database queries can be optimized by using a multi-platform cost model that take into account the respective cost of execution in each one of the multiple execution platforms. The respective costs of the execution can, for example, include cost associated with one or more operators for executing the one or more database queries in each one of the multiple execution platforms and/or the costs of exchanging data between the multiple execution platforms.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 4, 5, 6, 7, 8 and 9 depict a number of exemplarily implementation configurations that can be supported in accordance with various embodiments.

DETAILED DESCRIPTION

As noted in the background section, techniques for optimization of database queries are very useful.

To further elaborate, optimization strategies can be categorized into a number of categories with respect to the search space explored by the strategy.

Figure 1A:
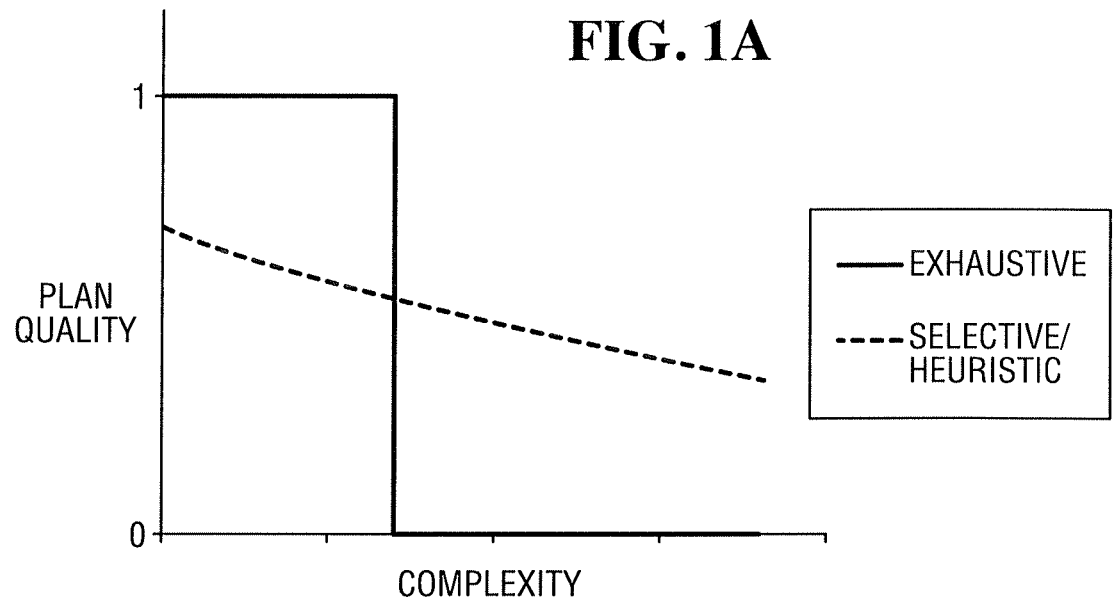
FIG. 1A depicts the plan quality produced by the Exhaustive approach as the query complexity increases.

One category of optimization strategies is the Exhaustive approach (or semi exhaustive) where the optimizer explores all possible enumerations of the query execution tree based on a set of equivalency relationships (e.g. Join (T1,T2)⇔Join(T2,T1)) and a set of operator implementation types (e.g. Hash Join, Nested Loop Join etc.) that are considered by the optimizer. Examples of this approach include IBM DB2 bottom up dynamic programming and MS SQL server top down branch and bound optimizers. The different execution plans can be compared based on an optimizer cost model and the cheapest plan is chosen. One advantage of this approach is its ability to capture the optimal plan (based on the optimizer cost model and cardinality estimation). The method can have a main disadvantage, however, namely, the performance of the optimization process itself as the query complexity increases. For example, consider that there are N! possible join orders and $J^{(N-1)}$ possible join implementation for each join order (where N is the number of tables joined and J is the number of join implementation types). Optimizers use the principle of optimality approximation to reduce the complexity of the search space exploration. However, even with the use of the principle of optimality, the explored search space complexity remains exponential which puts a limit to the type of queries that can be handled with this pure approach. This limit varies from a system to another depending on the implementation used. For most systems the limit can be between 10 to 15 table join (several other factors involved). While this approach is not ideal for compiling very complex queries; it remains the best approach for simple, medium, and moderately complex queries. FIG. 1A depicts the plan quality produced by this approach as the query complexity increases. This is a conceptual graph for the purpose of describing the behavior of the different approaches. The plan quality metric can be thought of as the cost of the optimal plan divided by the cost of the optimizer chosen plan. A value of 1 is the maximum possible which represent an optimal plan (based on the optimizer cost model) while a low value represent a low quality plan. As shown in the graph of FIG. 1A, the approach generates optimal plans for queries below a certain complexity threshold while fails to produce plans for queries with higher complexities (represented in the graph with plan quality value of zero).

A second optimization approach is the Heuristic approach (or Selective Plan) where the optimizer heuristically constructs one execution plan based on a particular algorithm that is proprietary of the system. In general the algorithm goals would be to maximize the usage of indexes including primary indexes, minimize the query plan data flow, minimize data reordering and repartitioning, and other goals that could be specific to the system strength and limitations. Example of such system is the older Oracle RBO optimizer.

One advantage of this approach is the relatively faster optimization even for very complex queries. However, one limitation is that there is no guarantee the optimal plan as this approach can often generate sub-optimal plans for medium and complex queries. The quality of the plan decreases as the complexity increases but in a gradual way avoiding the cliff like behavior of the exhaustive method. FIG. 1A shows the general behavior with this approach. It should be noted that the scale depicted in FIG. 1A is not linear and for demonstration purpose only. Also, the overall quality of the plans and the speed with which they deteriorate can depend on the algorithm used for the plan construction. It should also be noted that approach is often referred to as rule-based optimizer.

A third approach to optimization of database queries is the Selective search space approach. This approach is similar to the first approach noted above (Exhaustive approach) in that numerous plans are explored and the best plan is chosen based on the optimizer estimated cost. In this approach, however, the optimizer enumerates only a subset of the search space based on a certain enumeration algorithm. Some systems use this approach as a complementary approach to first approach (Exhaustive approach) and invoke it when the complexity is high while using the first approach for the majority of the queries which have complexity below the cliff point. The algorithms used are often heuristic-based such as greedy search algorithms (e.g. MySQL) but could be more complex such as selective sampling (e.g., SQL/MX) and genetic algorithms (e.g., Postgres). This approach has similar plan quality vs. query complexity behavior as the second approach (Heuristic approach). It is reasonable to expect a better overall plan quality with this approach than the second approach described above (Heuristic approach) due to the higher optimization effort, but an accurate comparison would depend on the algorithms used in both approaches.

Most popular systems use the exhaustive approach due to its reliability on the most common query ranges. To handle the more complex queries the systems use one of the two methods described above, namely, the Heuristic and Selective approaches. One solution is to switch to a Heuristic or a Selective approach when query complexity is above a certain limit that would result in unacceptable compile time using the exhaustive approach. The quality vs. complexity graph for this solution would be similar to the max value of the two graphs in FIG. 1A-taking into account that the switch need to start from a safe point before the actual cliff in the exhaustive graph.

Figure 1B:
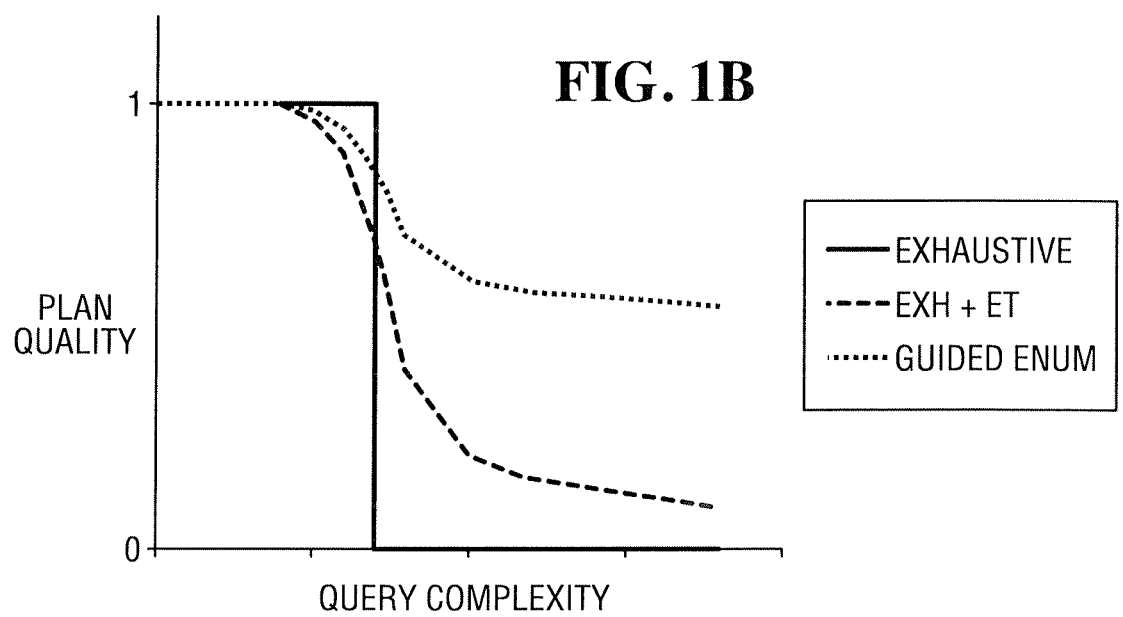
FIG. 1B depicts the behavior of this approach under the label (Exh+ET) for exhaustive with an early termination.

A second solution would be to include a breaking mechanism into an exhaustive search in order for the optimization process to terminate gracefully after a certain optimization effort limit is reached, generating the best plan found so far. One way to perform this is to limit the search parameters of the exhaustive search such as the depth limit of the search (or the look-ahead value) to limit the explored search space. The result of this approach is to enable the optimizer to compile queries beyond the exhaustive limit at the expense of plan quality due to the early termination. FIG. 1B shows the behavior of this approach under the label (Exh+ET) for exhaustive with an early termination. The plan quality of queries beyond the complexity threshold is typically poor due to the unplanned early termination. The quality can be improved significantly by incorporating into the original exhaustive enumeration algorithm the ability to evaluate the potential of each step in generating better plans and performing the steps in order of potential. As a result of this guided enumeration, an early termination would likely result in much higher plan quality, in comparison to early termination of general unguided enumeration, since the most promising parts of the search space are explored first. The behavior of this approach is depicted in FIG. 1B under the Guided Enumeration label.

In addition to handling the complexities involved in traditional DBMS systems, improved optimizers need to handle added complexity of Multi-Platform optimization where runtime can be on two or more distinct execution platforms (e.g., The Intel x86 based Linux server and the Atom FPGA based hardware accelerator). In general, the operators of a query tree can be executed on any one of multiple platforms. However, each of the platforms can have different performance characteristics and different restrictions. Furthermore, there is a cost associated with the transfer of data between the platforms. It will be appreciated that the choice of which parts of the query plan to be executed on which platform in a manner that utilizes the strength of each platform, can avoid specific platforms limitations, and can reduce the cost of data movements across platforms. For example, in order to accelerate query processing, a query may be analyzed and broken it down into its tasks. A hardware execution resources or software execution resources can be utilized to process the query. The hardware execution resources, can, for example, be provided as a query processing modules (QPMs) that may utilize database machine code instructions referred to as "MOPs" to perform a particular task of a query. The software execution resources, can, for example, be provided as query software modules (QSMs) that are implemented in software and can utilize software operations referred to as (SOPs) to perform their tasks of the query.

A SOP can be one or more instructions that are executed with software. That is, a SOP is executed by a QSM running, for example, on a general-purpose CPU, such as an x86 processor from Intel. In addition, the QSM can provide communications interface for coordination with other tasks being performed by another resource, such as, for example, one or more QSMs or one or more other QPMs.

Alternatively, a MOP can be provided as one or more instructions that are executed with hardware. In particular, a MOP can be executed in hardware as database machine code instructions, for example, on custom hardware, such as a HARP, in what can be referred to as a Query Processing Module (QPM). Such custom hardware are, for example, also described in the related applications noted below, which are incorporated by reference.

In view of the foregoing, improved optimization techniques for optimization of database queries in database system and environments are needed and would be highly useful.

It will be appreciated that the execution of the one or more database queries can be optimized by using a multi-platform cost model that take into account the respective cost of execution in each one of the multiple execution platforms, in accordance with one aspect.

In accordance with another aspect, an abstract representation can be used to optimize a database query in accordance with one aspect. As an abstract representation, a set of equivalent logical structures representative of multiple execution plans for execution of a database query can be used to optimize a database query. A logical structure can include one or more logical operators each representing multiple physical operators for executing the database query. In accordance with another aspect, Group and Operator Rules can be applied as rules to the set of equivalent logical structures to obtain additional equivalent logical structures and logical operator until no additional logical operators can be obtained. In accordance with yet another aspect, a set of possible implementation plans for the total number of the obtained logical operators can be obtained, for example, based on physical and/or implementation context. In accordance with still another aspect, an optimization request can be effectively propagated through an implementation plan in a top-down manner, for example, recursively for each child of physical operators, where only new contexts are optimized, in order to generate an optimized structure, for example, in consideration of, implementation details, costs, physical properties, etc. One of the optimized structures can be selected as an optimal plan.

Embodiments of these aspects of the invention are also discussed below with reference to FIGS. 2A-14. However, those skilled in the art will readily appreciate that the detailed description given herein with respect to these figures is for explanatory purposes as the invention extends beyond these limited embodiments.

Figure 2A:
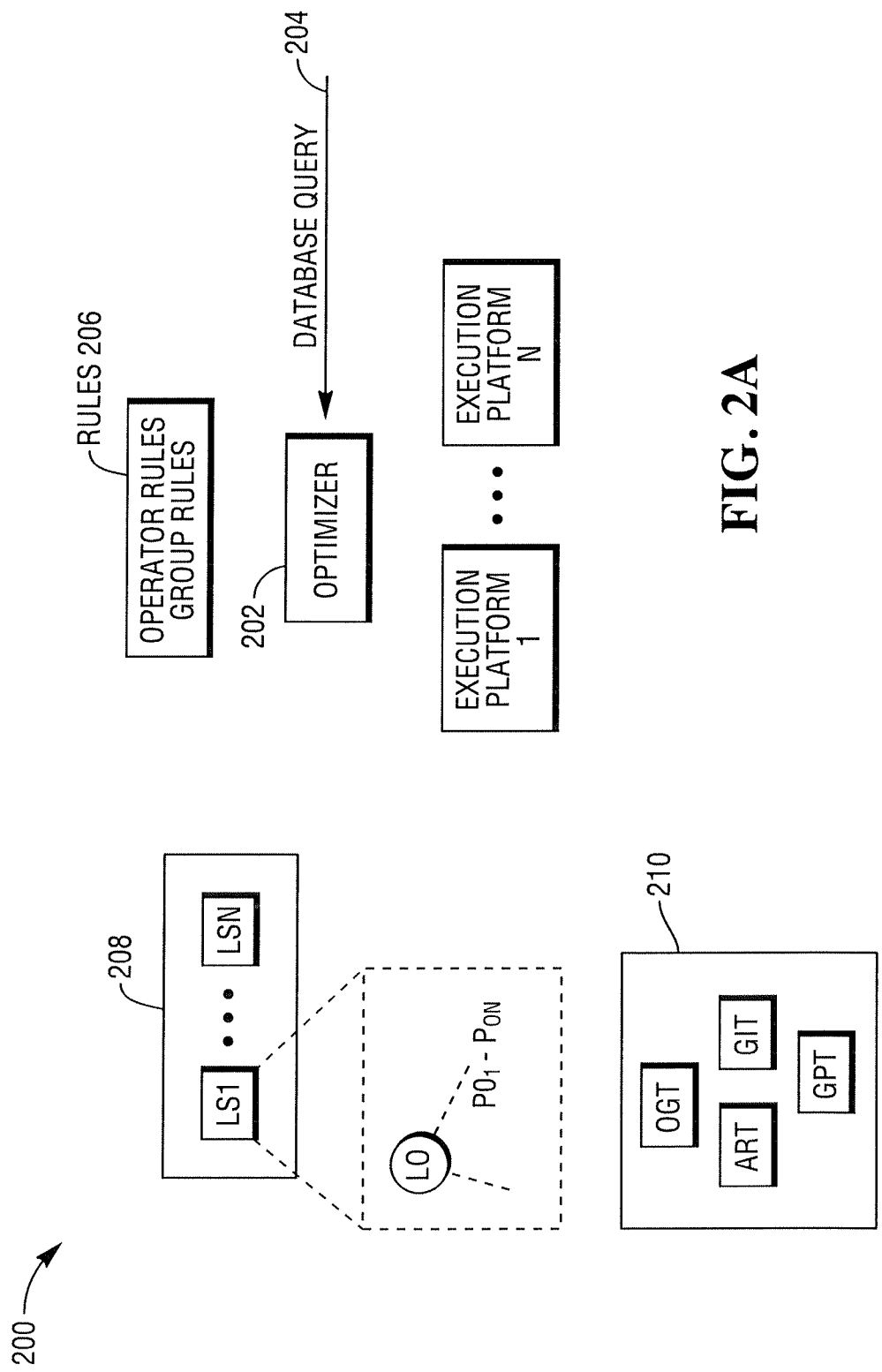
FIG. 2A depicts a computing environment with an optimizer in accordance with one embodiment.

FIG. 2A depicts a computing environment 200 with an optimizer 202 in accordance with one embodiment. Referring to FIG. 2A, the optimizer 202 can optimize a database query 204 for execution in a database or database system (not shown) as those skilled in the art will readily appreciate. Moreover, it will be appreciated that the optimizer 202 can optimize database query 204 based on one or more rules 206 and at least one of set equivalent logical structures 208 in accordance with the embodiment depicted in FIG. 2A.

As will be described in greater detail below, the one or more rules 206 can include one or more operator rules and/or one or more group rules. A group rule (or Group-Rule) can be a rule applied to a group of abstract relations represented as an abstract structure (e.g., abstract tree) to generate one or more equivalent fully or partially specified structure (or a Relational Operator (RelOper) structure). An operator rule (or Operator-rule) can be applied to a fully or partially specified structure (or a Relational Operator (RelOper) structure) to generate one more different but equivalent fully or partially specified structures (e.g., RelOper trees).

Simply put, the optimizer 202 can obtain and apply the one or more rules 206 to a set of equivalent logical structures (LS1) to obtain another one or more sets of equivalent logical structures (LSN). As a result, multiple sets of equivalent logical structures 208 (LS1-LSN) can be generated based on the one or more rules 206. As suggested in FIG. 2A, a logical structure can have at least one logical operator (LO) representative of multiple physical operators that can be used to execute the database query 204. It should also be noted that as a result if applying the one or more rules 206 to a set of equivalent logical structures (LS1) one or more new logical operators can be obtained in the one or more sets of equivalent logical structures (LSN).

The optimizer 202 can effectively can continue to apply the one or more rules 206 to a set of equivalent logical structures (LS1) to obtain more sets of equivalent logical structures (LSN) until no new (or additional) logical operators can be obtained. Thereafter, the optimizer 202 can determine a set of possible implementation plans for the total number of the logical operators in the structures (e.g., trees). Optionally, one or more of the possible implementation plans can then be eliminated by the optimizer 202, based on one more criteria (e.g., optimization cost, heuristics) to obtain a number plausible implementation plans. It will also be appreciated that the optimizer 202 can obtain the plausible implementation plans based on context of execution, including, for example, physical context, implementation context, platform context. In other words, the optimizer 202 can, for example, consider the cost of execution in different platforms, as well as the cost of transferring data between multiple platforms or execution platforms.

To select one of the plausible implementation plans as an optimal execution plan, the optimizer 202 can effectively process each one of the plausible implementation plans to generate an optimized structure (e.g., a tree) that includes one or more physical operates for executing the database query. In doing so, the optimizer 202 can, for example, effectively propagate an optimization request through a plausible structure in a top-down manner. This propagation can, for example, be done recursively for each child of physical operators, where only new contexts are optimized to generate in accordance with one embodiment that will be described further below.

It will also be appreciated that the processing or each one of the plausible implementation plans to generate an optimized structure, or the optimizing process can be accomplished by a number of optimization tasks that can be less than the number of optimization tasks conventionally used. Referring to FIG. 2A, a reduced number of optimization tasks are represented in a task graph 210 consisting of a Optimize-Group-Task (OGT) at a top layer, Apply-Rule-Task (ART) and Generate-Implementation-Task (GIT) at a middle layer, and a Generate-Plan-Task (GPT) at a bottom layer as will be described in greater detail below. It should also be noted that priorities can be assigned optimization tasks associated with plausible implementation plans to affect the order of the propagating of the optimization tasks or requests through the plausible structure as will also be described in greater detail below. In other words, a node of a logical structure can be assigned a priority for the optimization process. In addition, statuses can be assigned optimization tasks and/or nodes of the logical structures in the optimization process. The statuses can, for example, include completed, waiting [on child], scheduled to run, and running as will also be described in greater detail below.

Figure 2B:
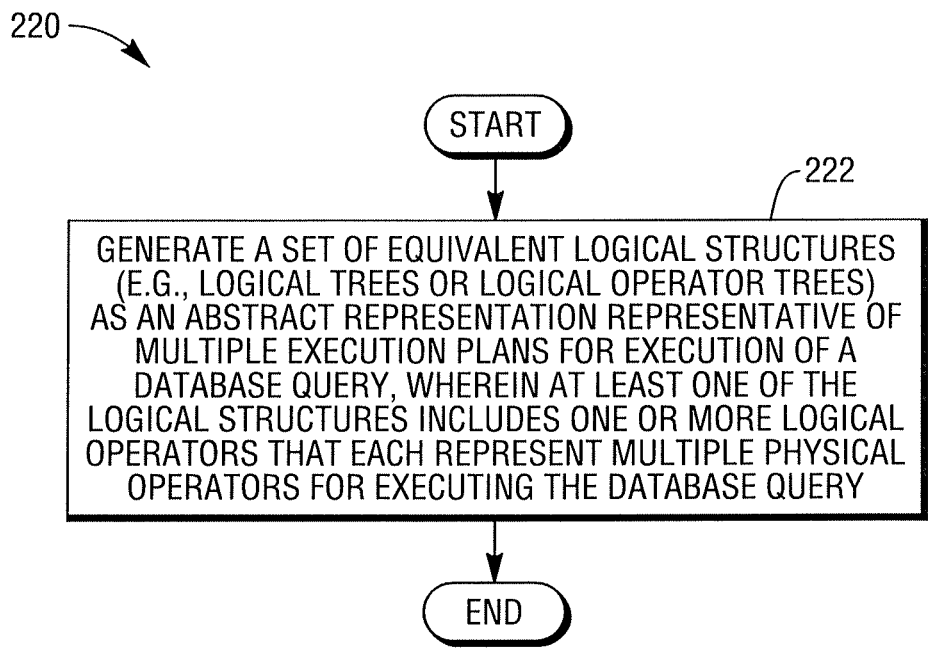
FIG. 2B depicts a method for optimization of database queries in accordance with one embodiment.

To further elaborate, FIG. 2B depicts a method 220 for optimization of database queries in accordance with one embodiment. Method 220 can, for example, be performed by the optimizer 202 (shown in FIG. 2A). Referring to FIG. 2B, a set of equivalent logical structures (e.g., logical trees or logical operator trees) can be generated (222) as an abstract representation representative of multiple execution plans for execution of a database query. It should be noted that at least one of the logical structures can include one or more logical operators that each represent multiple physical operators for executing the database query.

The set of equivalent logical structures can be used as input to an optimization technique in accordance with another embodiment. To further even elaborate, FIG. 2C depicts a method 230 for optimization of database queries in accordance with another embodiment. Method 230 can, for example, be performed by the optimizer 202 (shown in FIG. 2A). More particularly, method 230 can process a set of equivalent logical structures by applying (232) one or more rules to obtain another set of equivalent logical structures and at least one new logical operator until no additional new logical operators can be obtained. Next, a set of possible implementation plans are determined (234) for the total number of the obtained logical operators. It will be appreciated that the set of possible implementation plans can, for example, be determined based on context, or physical context, or platform specific contexts). Thereafter, optionally, eliminating [based on an optimization cost limit] a number of possible implementation plans can be eliminated (236 and 238), for example, based on a cost limit and/or heuristics, to obtain one or more plausible implementation plans that can be respectively represented as one or more plausible structures (e.g., trees). In any case, for each one of the plausible implementation plans, an optimization request can be effectively propagated (240) through its plausible structure, for example, in a top-down manner recursively for each child of physical operators, where only new contexts are optimized. As result, of the propagating (240) one or more optimized structures are generated that can each include one or more physical operates for executing the database query. Thereafter, one of the optimized structures can be identified and selected (242) as an optimal plan before the method 230 ends.

Figure 2E:
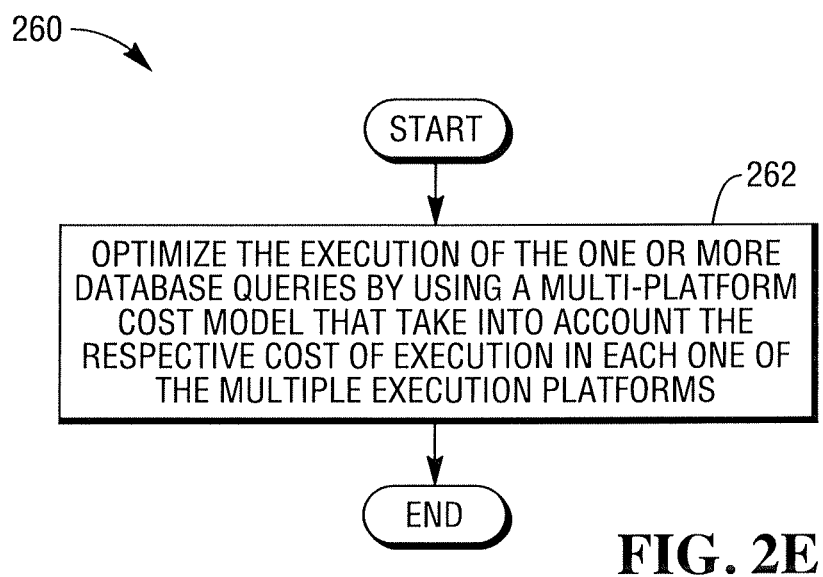
FIG. 2E depicts a method for optimization of database queries in accordance with still another embodiment.
Figure 2C:
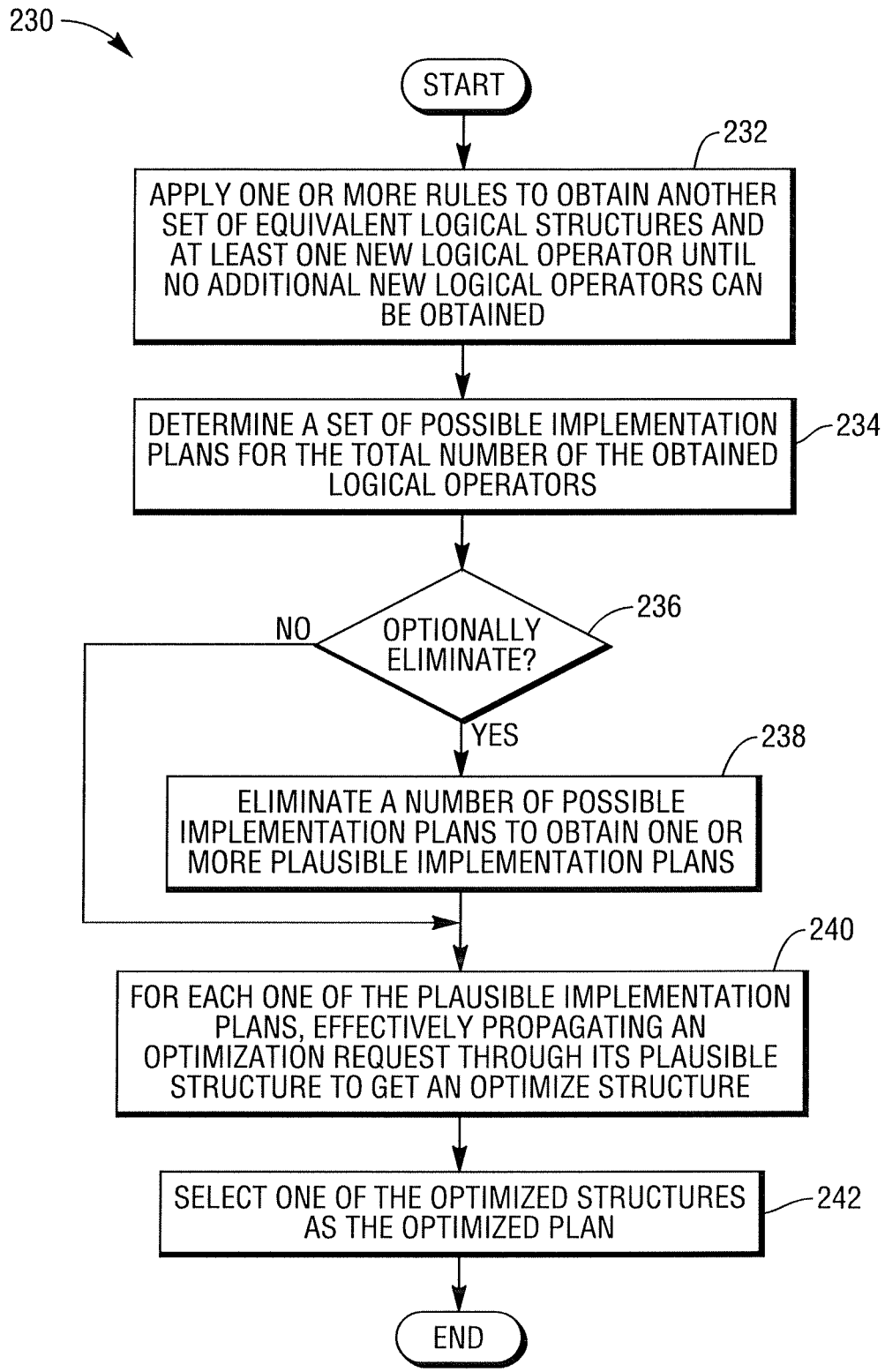
FIG. 2C depicts a method for optimization of database queries in accordance with another embodiment.
Figure 2D:
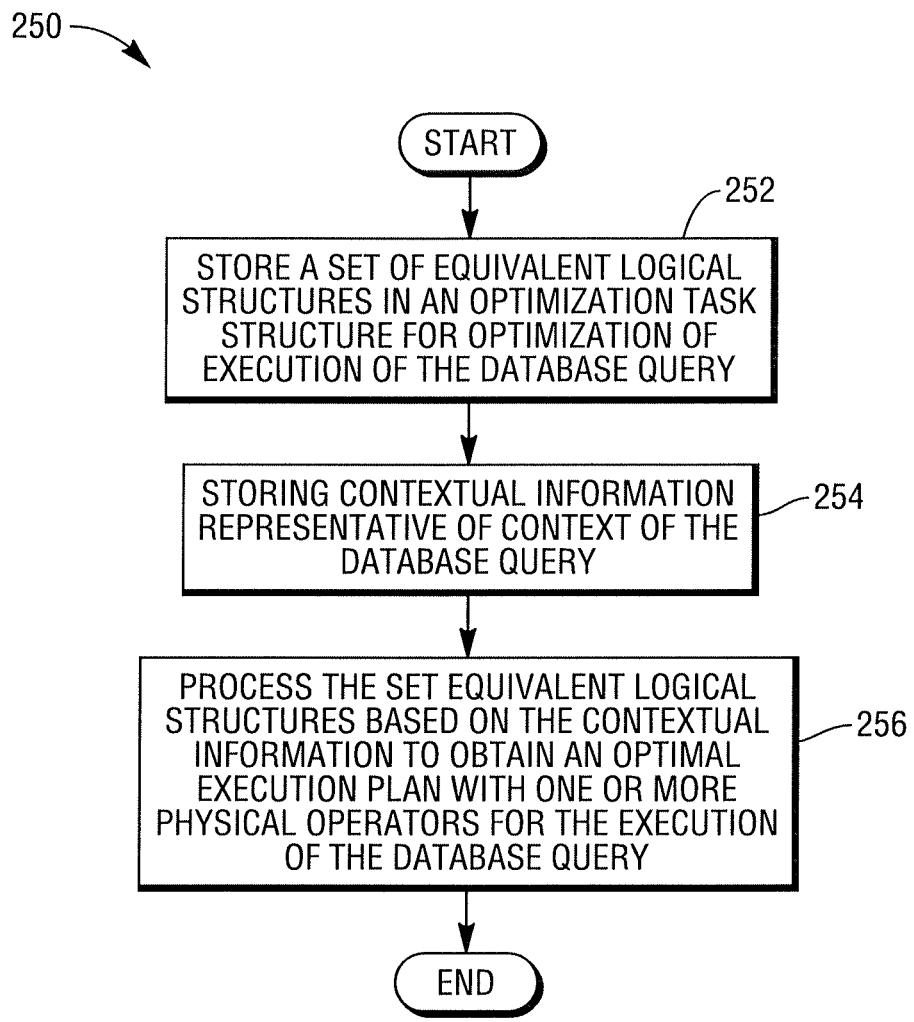
FIG. 2D depicts a method for optimization of database queries in accordance with yet another embodiment.

To elaborate still further, FIG. 2D depicts a method 250 for optimization of database queries in accordance with yet another embodiment. Method 250 can, for example, be performed by the optimizer 202 (shown in FIG. 2A). Referring to FIG. 2D, a set of equivalent logical structures are stored (252) in an optimization task structure for optimization of execution of the database query. In addition, contextual information representative of context information associated with the database query are stored (254). The contextual information can, for example, be representative of the database query as a whole. The contextual information can also, for example, include information pertaining to physical contexts (e.g., specific physical operators) associated with one or more platforms where the database query can be executed. The set of equivalent logical structures are processed (256) based on the contextual information to obtain an optimal execution plan with one or more physical operators for the execution of the database query before the method 250 ends.

To elaborate further yet, FIG. 2E depicts a method 260 for optimization of database queries in accordance with another embodiment. Method 260 can, for example, be performed by the optimizer 202 (shown in FIG. 2A). Referring to FIG. 2E, optimizing the execution of the one or more database queries can be considering (262) a multi-platform cost model that take into account the respective costs of execution in each one of the multiple execution platforms. The respective cost of execution can, for example, include cost associated with one or more operators for executing the one or more database queries in each one of the multiple execution platforms. As an example, the multi-platform cost model can further or alternatively take into account the cost of execution with respect to the cost of exchanging data between the multiple execution platforms. Also, an execution location can be included in an Optimization Goal so that the execution location becomes a dimension of search space for the optimization of the one or more database queries. As another example, different operator placements can be enumerated by generating all valid configurations of Implementation based on the required execution location and on each one the multiple platforms. Furthermore, one or more restrictions on what can or cannot be executed on each one of the multiple platforms can be taken into account, as well as the execution location in the cost models of the operators, and the cost of exchanging data between the platforms in the cost model of the Implementation.

Optimizer Data Structures

Data structures that can be provided in accordance with one or more embodiment will be described.

Figure 3:
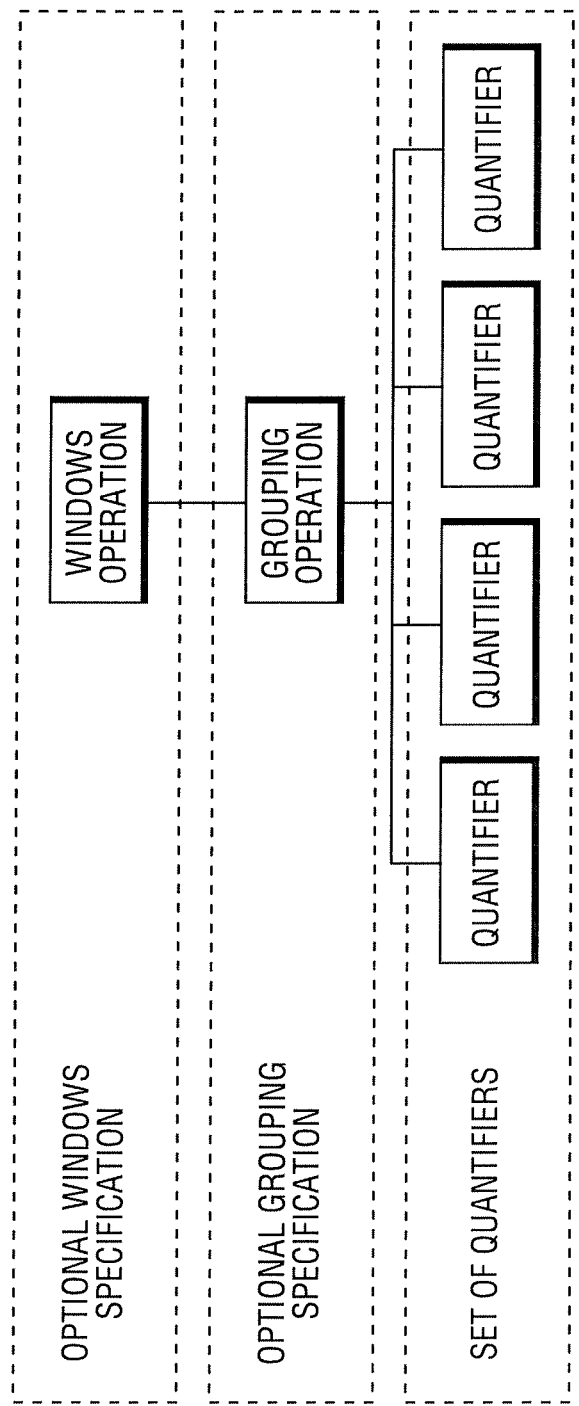
FIG. 3 depicts a basic template of the c2oe_LogicalDesc class in accordance with one embodiment.
Figure 4:
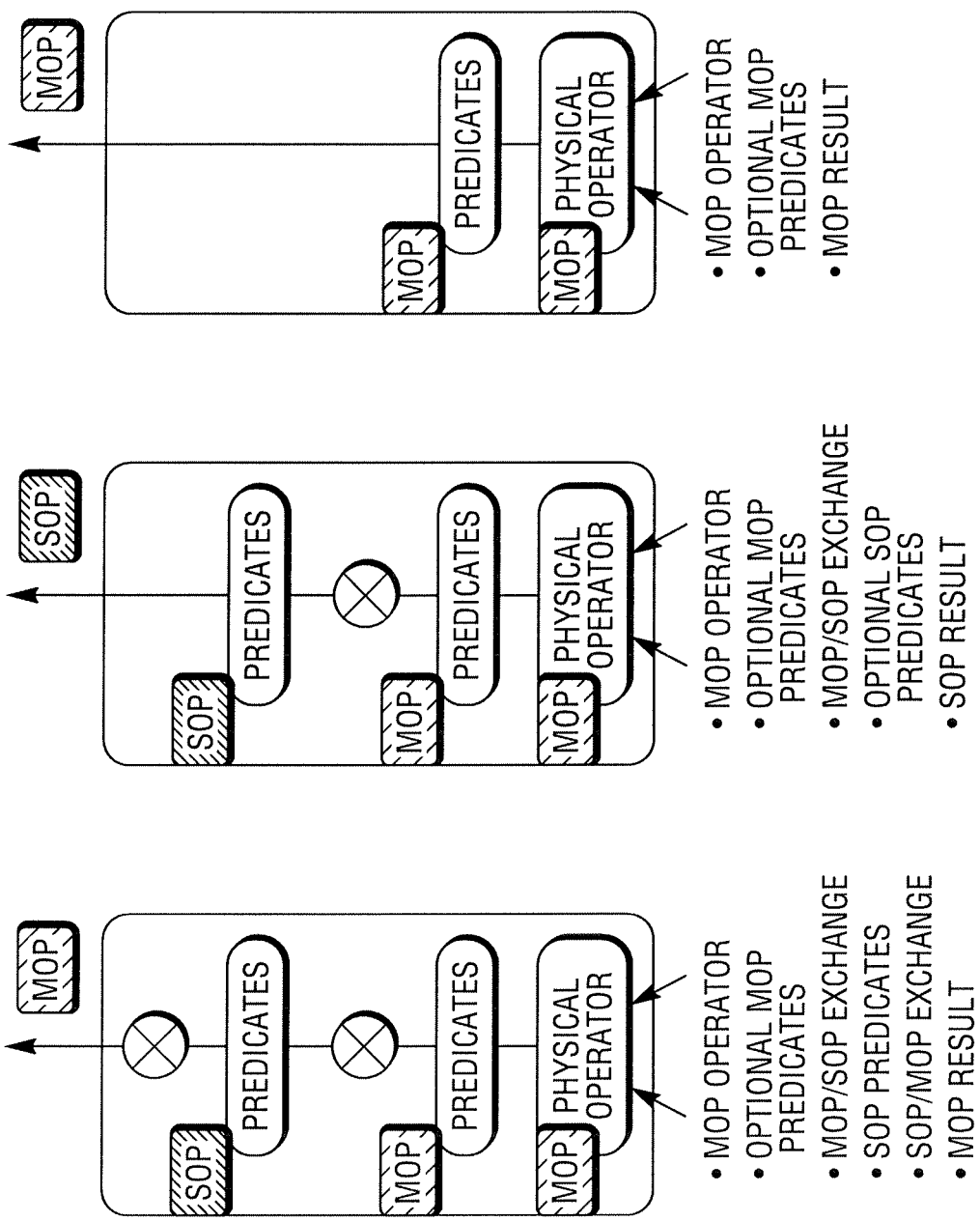
Figure 5:
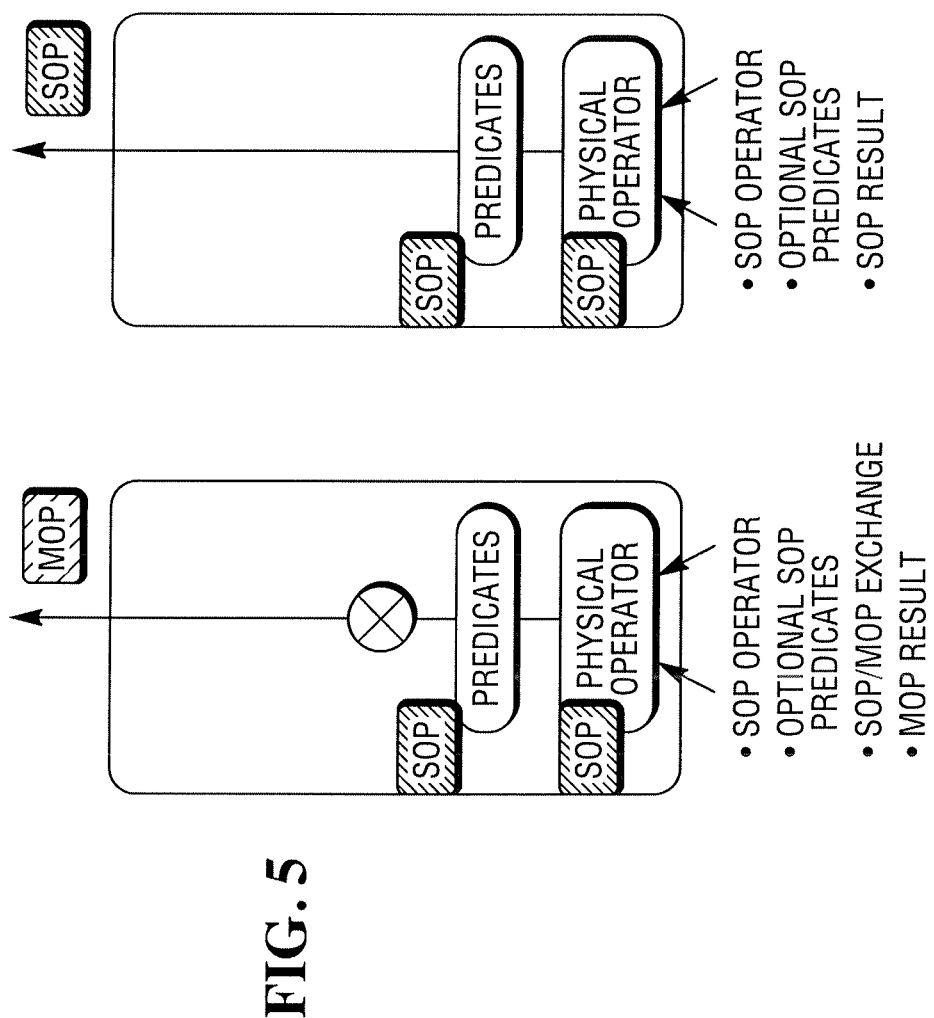

Class c2oe_LogicalDesc: FIG. 3 depicts a basic template of the c2oe_LogicalDesc class. The c2oe_LogicalDesc class defines a logical relation. This class is used by the optimizer to describe the relation (i.e. a relational table) produced by all the candidate query sub-trees generated for a given level of the query tree. The relation defined by the c2oe_LogicalDesc is logical in that it specifies a relation, but does not specify the operations needed to be performed in order to construct the relation. It basically represents a logical query block. The basic template of the c2oe_LogicalDesc contains an optional window operation, an optional grouping operation and set of Quantifiers. The type of the c2oe_LogicalDesc defines the relationship between the Quantifiers. The type of the c2oe_LogicalDesc is either a JOIN, UNION, INTERSECT, OUTER_JOIN, or EXCEPT blocks.

Class c2ro_RelOper: The c2ro_RelOper class represents a single relational operator or in the case of the c2ro_AbstractOper class, a logical relation. For example the c2ro_Join, c2ro_GroupBy and c2ro_Scan classes (all derived from c2ro_RelOper), represent the relational operations of Join, GroupBy and Scan respectively. Each instance of a c2ro_RelOper is associated with a c2oe_LogicalDesc which defines the logical relation rooted by the c2ro_RelOper. All c2ro_RelOper instances that are the root of logically equivalent query sub-trees will be associated with the same c2oe_LogicalDesc. There are at least three basic types of c2ro_RelOper:

Abstract (c2ro_AbstractOper: c2ro_RelOper). This c2ro_RelOper contains no additional information other than its associated c2oe_LogicalDesc and as such, it simply represents a logical relation. The c2ro_AbstractOper is the seed from which the optimizer generates a query tree (a tree of c2ro_RelOper instances) representing the logical relation.

Logical (various operators derived from c2ro_RelOper). The logical operators are c2ro_RelOpers representing specific relational operators, but with no particular implementation (e.g. c2ro_Join). Logical operators are generated by the application of Group rules on an Abstract operator or by the application of Operator rules on Logical operator. The resulting logical c2ro_RelOpers will be associated with the same c2oe_LogicalDesc that is associated with the operator from which it was generated.

Physical (various operators derived from their respective logical operators). The physical operators are c2ro_RelOpers representing specific relational operators with a specific implementation (e.g. c2ro_HashJoin). Physical operators are generated via an invocation of the virtual method generateImplementation(context) on a logical operator. Each invocation of this method will return a set of physical operators, each of which is a valid implementation of the logical operator while honoring the requirements of the given context. When a physical operator is generated, it is created as part of an implementation (see class c2ro_Implementation below). The resulting physical c2ro_RelOpers will be associated with the same c2oe_LogicalDesc that is associated with the Logical operator from which it was generated.

Class c2ro_Implementation: The c2ro_Implementation class represents a physical relational operator along with the execution location (MOP/SOP) of the operator, the execution location of any associated predicates and the location of the resulting relation. Implicit in the implementation is the notion of an Exchange operator which exchanges data from one location to another: MOP to SOP or SOP to MOP. The operator can execute in either MOP or SOP. The predicates can also execute in either MOP or SOP or a combination of the two (i.e. some predicates in MOP and some predicates in SOP). Any transition from MOP to SOP or SOP to MOP results in an Exchange operator. Not all combinations need be supported. FIGS. 4, 5, 6, 7, 8 and 9 depict a number of exemplarily implementation configurations that can be supported in accordance with various embodiments.

Figure 9:
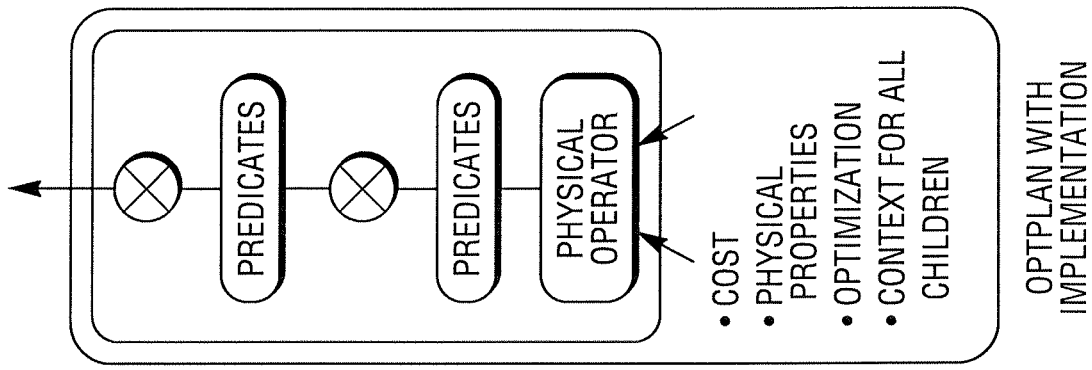
Figure 8:
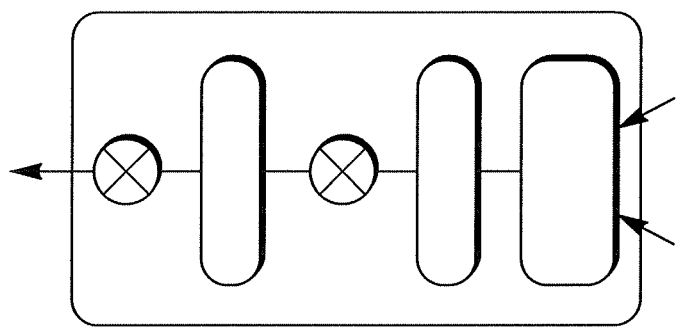
Figure 8:

Lifecycle of a c2ro_RelOper: The lifecycle of a c2ro_RelOper, from Abstract operator to Logical operator to Physical (as part of an implementation) can by orchestrated by an optimizer in accordance with one or more embodiments. FIGS. 6, 7 and 8 depict a number of basic lifecycles. FIG. 9 depicts an optimal plan (OptPlan) with its implantation as a Class c2oe_OptPlan. The Class Hierarchy for c2ro_RelOper is detailed below.

The Class Hierarchy for c2ro RelOper:

c2ro_RelOper: The c2ro_RelOper class is the base class for all Relational Operators. It contains basic information and structures common to all c2ro_RelOpers such as post operator predicates and references to child c2ro_RelOpers.

c2ro_AbstractOper: The c2ro_AbstractOper contains no additional information other than its associated c2oe_LogicalDesc and as such, it simply represents a logical relation. The c2ro_AbstractOper is the seed from which the optimizer generates a query tree (a tree of c2ro_RelOper instances) representing the logical relation.

c2ro_BoxOper: The c2ro_BoxOper is a logical RelOper which represents access to another Box. Within the RelOper tree, the c2ro_BoxOper is treated as a leaf operator.

c2ro_PhysBoxOper: The c2ro_PhysBoxOper is the physical version of the Box Operator.

c2ro_GroupBy: The c2ro_GroupBy class represents a logical GroupBy operator. It contains information specific to all GroupBy operators such as a list of grouping expressions and a list of aggregate functions.

c2ro_HashGroupBy: The c2ro_HashGroupBy class represents a physical operator which implements the GroupBy operation using a hash algorithm or in some cases a DMAP algorithm.

c2ro_HashOrderedGroupBy: The c2ro_HashOrderedGroupBy class represents a physical operator which implements the GroupBy operation using a combination of ordered grouping and DMAP grouping. The operator expects its input to be ordered on the Hash of the grouping expressions.

c2ro_OrderedGroupBy: The c2ro_OrderedGroupBy class represents a physical operator which implements the GroupBy operation using a sort groupby algorithm. The operator expects its input to be ordered on the grouping expressions.

c2ro_Join: The c2ro_Join class represents a logical Join operator. It contains information specific to the all Join operators such as a set of join predicates.

c2ro_CrossJoin: The c2ro_CrossJoin class represents a physical Join operator for the case when there are no suitable join predicates. This operator implements the Join operation by producing the full cross product result and then applying a filter to remove non-qualifying rows.

c2ro_FIndexJoin: The c2ro_FIndexJoin class represents a physical operator which implements the Join operation using a forward index. This Join is used in the case of a FK-PK join in which the referring table is the outer table of the join. This join will be considered when there is an appropriate forward index available and the inner side is a simple table access.

c2ro_HashJoin: The c2ro_HashJoin class represents a physical operator which implements the Join operation using a Hash Join algorithm. This join operator can be used only when there are suitable equi-join predicates which provide lookup capabilities to the inner table.

c2ro_HashOrderedMergeJoin: The c2ro_HashOrderedMergeJoin class represents a physical operator which implements the Join operation using a combination of the Hash Join and Merge algorithms. The operator expects both of its inputs to be ordered on the Hash of the join expressions. This join algorithm useful for very large data sets since it supports overflow through sort operations. It is considered when both sides of the Join are very large.

c2ro_LookupJoin: The c2ro_LookupJoin class represents a physical operator which implements the Join operation by materializing the inner side of the Join as a temporary in-memory table and them probing the temporary table with the values from the outer side. The temporary table is typically a DMAP produced by an aggregation operation. Lookup joins are generated internally by certain rewrite rules. Joins (join predicates) marked as lookup joins must be implemented using this physical operator.

c2ro_PIndexJoin: The c2ro_PIndexJoin class represents a physical operator which implements the Join operation using a prefix index. This join is supported for integer and date types and will be considered when there is an appropriate prefix index available.

c2ro_RIDJoin: The c2ro_RIDJoin class represents a physical operator which implements a self-join on the RID of each table instance. RID Joins are introduced by certain rewrite rules to delay pulling in some columns of the table. The operation performed by the RID Join is essentially column projection.

c2ro_RIndexJoin: The c2ro_RIndexJoin class represents a physical operator which implements the Join operation using a reverse index. This Join is used in the case of a PK-FK join in which the referring table (FK) is the inner table of the join. This join will be considered when there is an appropriate reverse index available and the inner side is a simple table access.

c2ro_RIExistsSemiJoin: The c2ro_RIExistsSemiJoin class represents a physical operator which implements the Semi-Join operation using a reverse index. This Join is used in the case of a PK-FK join in which the referring table is the inner table of the join. These joins will be introduced by certain rewrite rules when performing an Exists sub-query operation between a PK (outer) and an FK (inner) and there is an appropriate reverse index available and the inner side is a simple table access. Joins (join predicates) marked as RI Exists Semi-joins must be implemented using this physical operator.

c2ro_RINotExistsSemiJoin: The c2ro_RINotExistsSemiJoin class represents a physical operator which implements the AntiSemi-Join operation using a reverse index. This Join is used in the case of a PK-FK join in which the referring table (FK) is the inner table of the join. These joins will be introduced by certain rewrite rules when performing a Not Exists sub-query operation between a PK (outer) and an FK (inner) and there is an appropriate reverse index available and the inner side is a simple table access. Joins (join predicates) marked as RI Not Exists Semi-joins must be implemented using this physical operator.

c2ro_Root: The c2ro_Root class represents a physical operator for the root of the query tree. The root operator has no equivalent logical operator. The root operator is added to the top of the query tree after optimization to aid in the generation of annotations associated with the order by specification and limit specification. This physical operator is an exception to the statement that all physical operators are generated by a call to the method generateImplementations( ).

c2ro_Scan: The c2ro_Scan class represents a logical operator for the scan operation. It contains information common to all scan operators.

c2ro_BTIndexScan: The c2ro_BTIndexScan class represents a physical operator which implements the Scan operation using a B-Tree index. A B-Tree index scan will be considered when there is an appropriate B-Tree index available and there is an appropriate predicate that can be used to access the B-Tree index.

c2ro_DRIndexScan: The c2ro_DRIndexScan class represents a physical operator which implements the Scan operation using a Date Range index or Prefix index. A Date Range index scan will be considered when there is an appropriate Date Range or Prefix index available and there is an appropriate predicate that can be used to access the index.

c2ro_TableScan: The c2ro_TableScan class represents a physical operator which implements the Scan operator by scanning the table. This is essentially the default method for scanning a table and will always be considered by the optimizer.

c2ro_TextIndexScan: The c2ro_TextIndexScan class represents a physical operator which implements the Scan operator by using a text index. The text index can be used by certain simple Like predicates. A Text Index scan will be considered when there is an appropriate text index scan available and when there is an appropriate Like predicate that can be used to access the text index.

c2ro_Select: The c2ro_Select class represents a physical operator for the root of the body of the query tree. The Select operator has no equivalent logical operator. The Select operator is added to the top of the body after optimization to aid in the generation of the SelectMethod annotation used to compute expressions needed by the head. This physical operator is an exception to the statement that all physical operators are generated by a call to the method generateImplementations( ).

c2ro_Sort: The c2ro_Sort class represents a physical operator which implements the Sort operation. The Sort operator has no equivalent logical operator, yet it is still generated by a call to the method generateImplementations( ) on the c2ro_Abstract class. The Sort operator is added as a result a Sort Requirement in the optimization context. When the generateImplementations( ) method is applied to a c2ro_Abstract instance with a context that contains a Sort Requirement, one of the implementations will have a Sort operator which enforces the Sort Requirement.

c2ro_Windows: The c2ro_Windows class represents the logical operator for the Windows operation. It contains information common to all windows operators.

c2ro_PhysWindows: The c2ro_PhysWindows class represents a physical operator which implements the Windows operation. Currently, this is the only implementation for the Windows.

Optimizer Memo

The optimizer memo is a data structure that captures the equivalency between the enumerated RelOper subtrees and track the optimization requirements and best plans for each subtree-requirement combination. The memo allows for the sharing of previously computed optimization plans with similar optimization requests during the query optimization process.

The optimizer memo can be provided as a collection of RelOper Equivalency Groups structures (herein "groups"). Each group is a collection of logical RelOpers that have the same logical_Desc i.e represent the same logical relation. Each group has one Abstract RelOper representing the group, and multiple non-abstract logical RelOpers. The children of the logical RelOpers are Abstract RelOpers representing other groups in the memo. The group contains also a collection of all Implementation instances for its logical RelOpers. Moreover, the group contains a collection of all Plan instances for these implementations.

The group maintains the history of all optimization contexts that it has been optimized for and the optimal Plan found for each optimization goal. Since a Plan instance has the optimization contexts for the corresponding RelOper children groups, constructing and materializing the final query plan is achieved by following the children contexts and their optimal Plans starting from the root node in the optimized tree down to the tree leaves. This can only be achieved after all the involved groups has been optimized using contexts generated by their parent.

A key feature for the efficiency of the memo structure is that its keyed by the Logical_Desc of the groups. No two groups are allowed to have the same Logical_Desc since this will imply that the two equivalency groups are actually equivalent and hence should have been one group. The ability to associate any RelOper generated during the query optimization with an existing equivalent group is unique to the Shark optimizer memo. This capability is a key feature for the elimination of expensive exploration steps needed in predecessor optimization engines.

Optimization Rules

The Optimizer Rules can be transformation rules that apply to a logical RelOper tree and generate one or more logically equivalent RelOper trees. A RelOper tree can be abstract, fully specified, or partially specified. A fully specified RelOper tree is one that has no Abstract RelOper as any of its nodes (i.e. all of its nodes are non-abstract RelOpers). A partially specified tree is a RelOper tree that has one or more leaf nodes as Abstract RelOpers. An abstract tree is a tree that is made of a single Abstract RelOper.

There are at least two types of rules:

Group-Rules: A group-rule is a rule that apply to the group's Abstract RelOper (an abstract tree) and generates one or more equivalent fully or partially specified RelOper trees, and Operator-Rules: An operator-rule is a rule that apply to a fully or partially specified RelOper tree and generate one or more different but logically equivalent RelOper trees.

An example of a group-rule is the Join-Enumeration-Rule which applies to an Abstract RelOper (with certain conditions applied) and generates equivalent partially specified join trees.

Abst(q1, q2)→Join(Abst(q1), Abst(q2)); Join(Abst(q2), Abst(q1))

Another example of a group-rule is the Scan-Rule which applies to an Abstract RelOper (with certain conditions applied) and generates equivalent fully specified scan tree (leaf node).

Abst(q1)→Scan(t1)

Another example of a group-rule is the Materialized-View-Rule which applies to an Abstract RelOper (with certain conditions applied) and generates equivalent fully specified scan tree (leaf node). Note: MVs are not supported yet in Shark.

Abst(q1 . . . qN)→Filter(Scan(mv1))

An example of an operator-rule is the Push-Group-By-Below-Join-Rule which applies to RelOper tree of a Group By as the top node in the tree and a Join as the direct child, and generates an equivalent tree of a Join as the top node and a Group By as one of the Join children.

Gby(Join(Abst(s1), Abs(s2))→Join(Gby(Abst(s1)), Abst (s2))

Rules can optionally assign a priority value to the newly generated RelOpers, which will be used later to compute the priorities of the optimization tasks applied to these RelOpers. More promising RelOper trees can be given higher priorities so their tasks could be scheduled earlier which helps reaching a better solution faster and increases the chance of effective pruning of the search space. If no priority is assigned by the rule, a default priority value of zero is assigned by the engine.

Priorities assigned by rules plays significant role in Shark's optimizer guided enumeration strategy. Every optimization engine task (described in next section) is assigned a priority based on the combination of its parent task and the priority of the RelOper (or Abstract RelOper in case of groups) it applies to. The sibling tasks are scheduled (and potentially pruned) based on their priorities. By allowing tasks with higher priorities to execute first, guided enumeration.

Tasks that have a higher chance of generating lower cost plans are executed first. As a result, a much larger part of the search space can be prune based on the cost of the available best plan. This means a much faster search toward the higher quality plans.

For very complex queries, the optimizer resource controller imposes limitations on the number of tasks to be executed and achieves this by gradually decreasing the priority threshold at which tasks are allowed to execute. By pushing more promising tasks first we assure the more promising part of the search space is optimized first increasing the likelihood of generating higher quality plans within the available resources.

Optimization Tasks

Optimize Group Task: The purpose of Optimize-Group-Task (OGT) is to compute, for a given optimization context, the optimal physical implementation among the group's possible logically equivalent implementations.

OGT performs the following: Schedules Apply Rule Tasks on all the group's logical operator trees in order to generate the set of all equivalent logical operator trees. When OGT is invoked for the first time, the group contains only the group's Abstract operator and, consequently, only group-rules are scheduled. The OGT first invocation is then completed and the optimizer engine schedules OGT to be invoked again after its child Apply Rule Tasks are executed, which would generate a set of new operators.

On the second invocation of OGT, the operator-rules are scheduled on all the new operators generated by the group-rules. Rules continue to be scheduled and applied to newly generated operators from earlier rule applications until no new operator is generated. At this point, the logical search space (as defined by the rule set and any applied heuristic) is completely generated and included in the group's list of logical operators. This group is referred to as logical operator complete w.r.t current optimization pass.

After all child Apply Rule Tasks are completed, and the group becomes logical operator complete, the optimizer engine invokes the parent OGT. At this invocation, OGT schedules Generate Implementations Tasks, for the given optimization context, on all of the group's logical operators that satisfies the current priority limit.

When an OGT is invoked on the same group using a different optimization context, at the same optimization pass, the scheduling of Apply-Rule-Tasks described above is not performed since the group is already logical operator complete. Such scheduling of the same rules would only generate duplicates of existing operators and is unnecessary. Generate-Implementations-Tasks, however, are scheduled as described above for the new optimization context.

Apply Rule Task

Apply-Rule-Task (ART) applies a particular transformation rule on a specified operator tree. There are two types of rules: group-rules which apply to the group's abstract operator and generate an equivalent fully or partially specified operator trees; and operator rules which apply to an operator tree and generate different but logically equivalent operator trees.

Each rule application may result in zero, one, or more operator trees as output. As a result of performing Apply-Rule-Task, the rule's output operator trees are inserted into the group's list of logical operators trees. At the time of insertion, the new operator tree is checked against existing operator trees to avoid inserting a duplicate tree.

An Apply-Rule-Task instance is only invoked once as it has no child tasks (i.e. it does not schedule other optimization tasks). Note: one possible enhancement is to allow ART to schedule other ART tasks on its output trees. These children ART tasks would be for restricted rules that are not part of the general rule set used by the OGT (which would be scheduled by the parent OGT in its next invocation).

Generate Implementations Task

Generate-Implementations-Task (GIT) applies on a given logical operator using a given optimization context with the goal of generating promising physical implementations for the logical operator. The task performs the following steps:

Invoke the virtual method RelOper::generateImplementations(context) which will return, as a result, the set of possible implementations for this logical operator given the context physical requirements such as sort order and execution location. An implementation is represented by a physical operator and its implementation details such as post filters; projections; and execution locations of each filter, projection, or the operator.

Among the set of possible implementations, a subset of promising implementations is chosen based on its potential of satisfying the optimization context cost limit. Simply the physical operator minimum cost is computed and if it exceeds the context cost limit, the implementation is excluded from the promising set.

For each implementation in the set of promising implementations, a Generate-Plan-Task is scheduled with the same optimization context. These schedule GPT tasks will carry out the optimization processes for the entire operator tree in a top-down manner.

Generate Plan Task

Generate-Plan-Task (GPT) applies on a given implementation instance (physical operator and implementation details) using a given context. The purpose of Generate-Plan-Task is to propagate the optimization request down the operator tree and generate a completely optimized tree of physical operators and their implementation details, costs, and physical properties. The task performs the following:

First, the implementation minimum cost is compared against the current context cost limit, and if it exceeds the limit the task terminates as this implementation will have no chance of being part of the optimal plan. Note that why similar step has already been performed against the implementation during the Generate-Implementation-Task, however the comparison is performed again since the context cost limit may have been updated (i.e. reduced) as a result of new competing plans resulting from sibling GPT tasks.

The task then invoke the method Implementation::generatePlans( . . . ) which would return a list of plans and corresponding list of optimization contexts for the physical operator children. The Implementation::generatePlans( ) method invokes virtual method RelOper::generatePlans( ) on the implementation physical operator which, based on the execution characteristics of the physical operator, determines the physical requirements on the operator children.

For each generated plan:
  For each child of the implementation physical operator, get the child group and the child context generated earlier for plan-child pair. Check to see if the child group has already been optimized with an identical context. If so, replace the child context with the already existing context. If this is a new context for the child group then schedule Optimize-Group-Context for the child group using the new child context and exit. The optimizer engine will schedule this GPT to run again after the child OGT is completed.
  After the plan's children are all optimized (either by finding an already optimized pre-existing identical child context, or by executing an OGT on the child group using the new child context), the current plan is finalized. The plan physical properties as well as the plan cost are computed (this is only possible now that the entire operator tree is optimized and). If the plan cost is lower than the context cost limit, the context best plan and cost limit are updated with the current plan and its cost.

Figure 10:
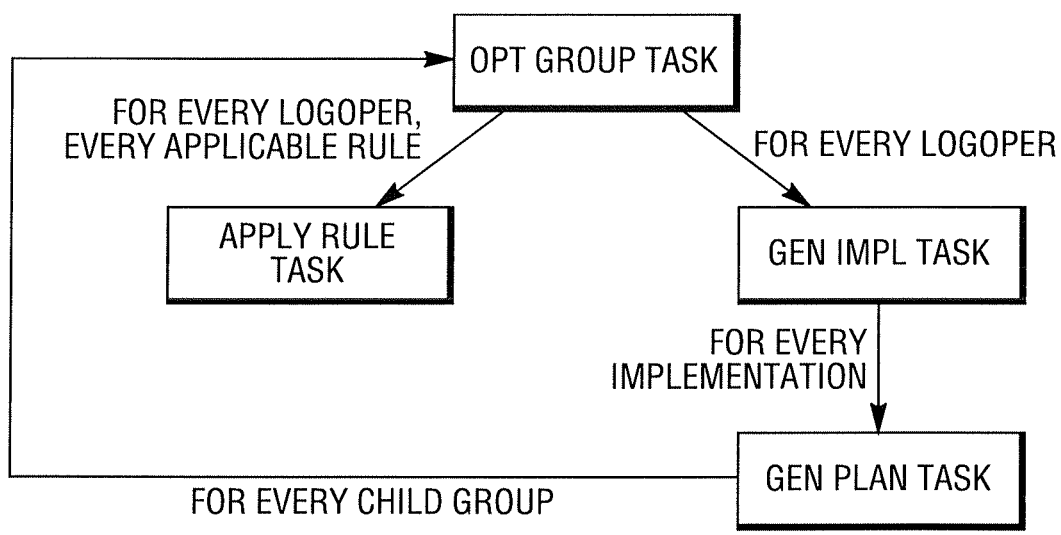
FIG. 10 depicts the relationship between four optimization engine tasks in accordance with one embodiment.

FIG. 10 depicts the relationship between four optimization engine tasks in accordance with one embodiment.

Task Graph & Task Scheduler

The optimizer tasks are maintained in a task graph structure for the purpose of scheduling. The children of each task are the tasks that were scheduled by it. The entire optimization process starts with a single Optimize-Group-Task on the root of the query operator tree. Subsequently, that task (which becomes the root task of the task graph), will schedule other tasks recursively in the manner described in the previous section, generating the entire task graph.

At any point during the query optimization process, an optimization task instance can have one of the following five states:
  Scheduled-To-Run (STR): The task has been scheduled and waiting the scheduler to run it.
  Running: The task is currently running (by invoking either the task's run( ) or finalize( ) methods).
  Waiting-On-Child (WOC): The task has run, scheduled one or more children tasks, and is now waiting for its children to complete.
  Completed: The task has ran; all of its children tasks have a state of either Completed or Pruned; and the task finalize( ) method has been executed.
  Pruned: The task has been pruned by the scheduler based on the priority guidance.

An active task is a task that has a state of STR, WOC, or Running. The active part of the task graph grows and shrinks during the optimization process. The optimization is completed once the root task reaches the state of Completed. This will also imply that all tasks in the task graph are either Completed or Pruned at this point.

Figure 11:
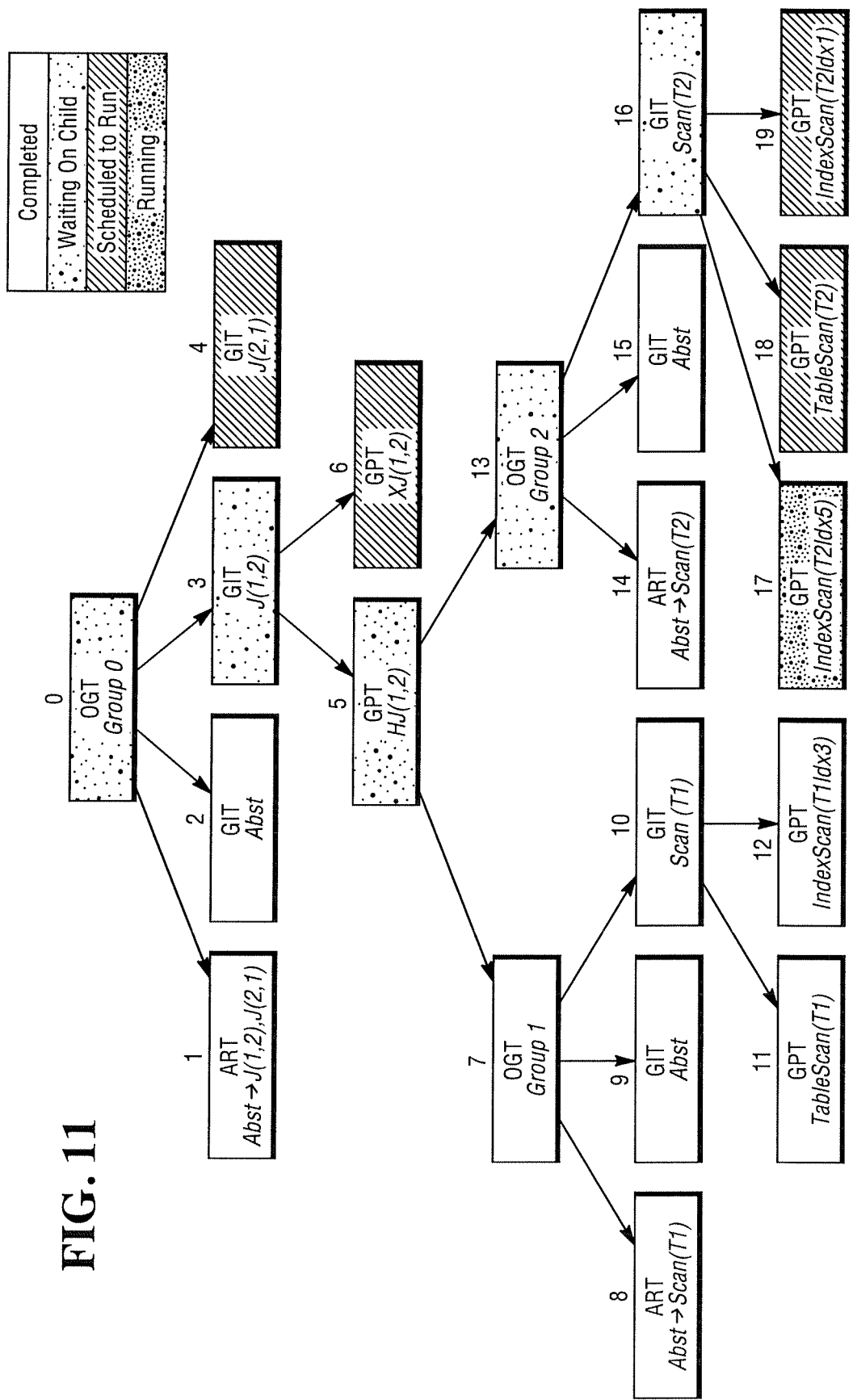
FIG. 11 depicts below an example of a task graph amid the process of optimization in accordance with one embodiment.

FIG. 11 depicts below an example of a task graph amid the process of optimization in accordance with one embodiment. The query in the example is a simple two-table join query: SELECT T1.0 FROM T1, T2 WHERE T1.A=T2.A AND T1.B='abc' and T2.B=100.

Referring to FIG. 11, at the snapshot of the task graph amid the query optimization process, a GPT scan generating a plan for an index scan on T2 is running. The graph shows which tasks have already completed and which ones are in Waiting-On-Child or Scheduled-To-Run state. A large number of tasks are not shown as they are yet to be created and scheduled by the running or outstanding tasks.

Figures 1, 12A:
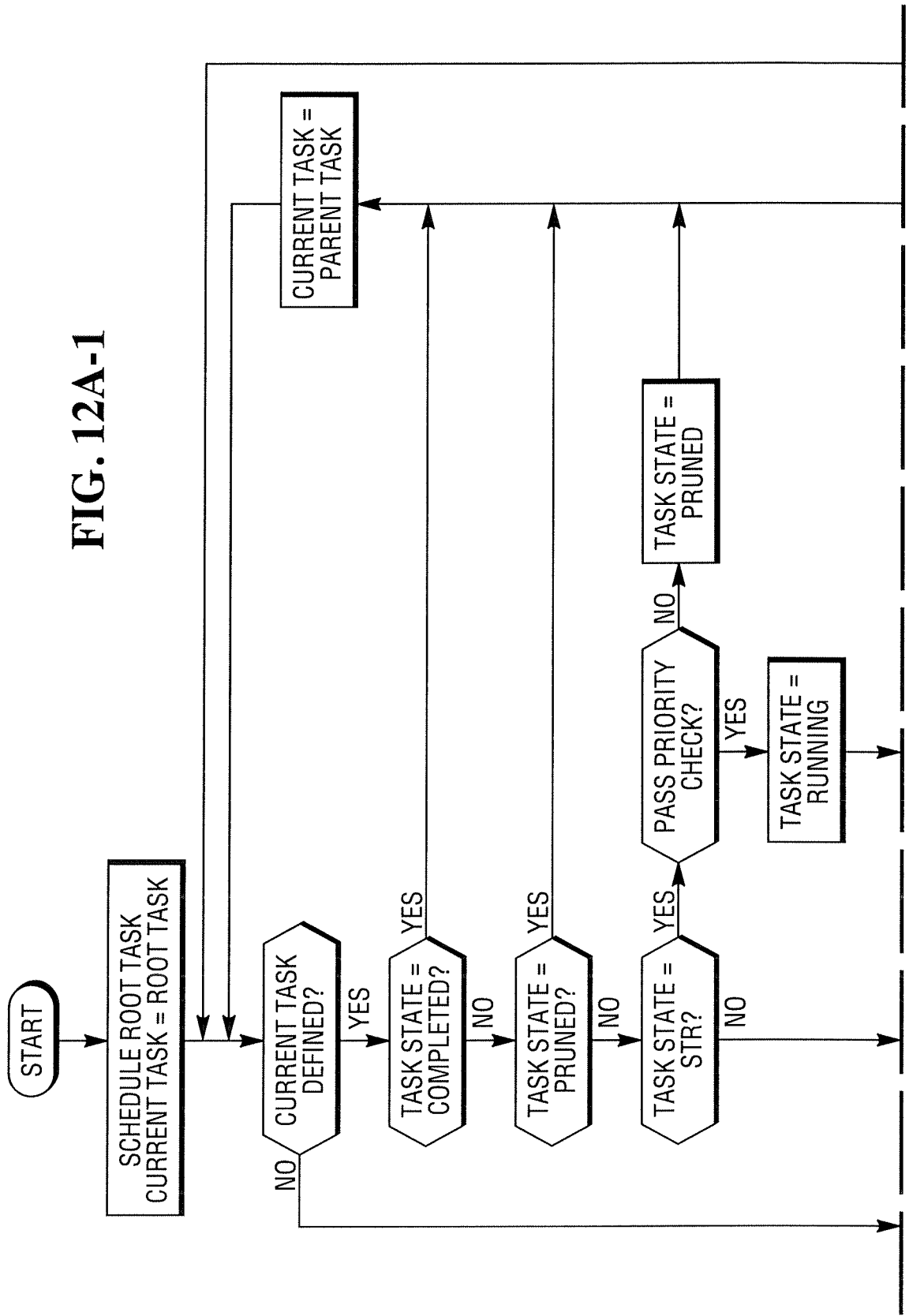
FIG. 12A (provided on two continuous sheets marked as 12A-1 and 12A-2) depicts a method for task scheduling in accordance with one embodiment.
Figures 2, 12A:
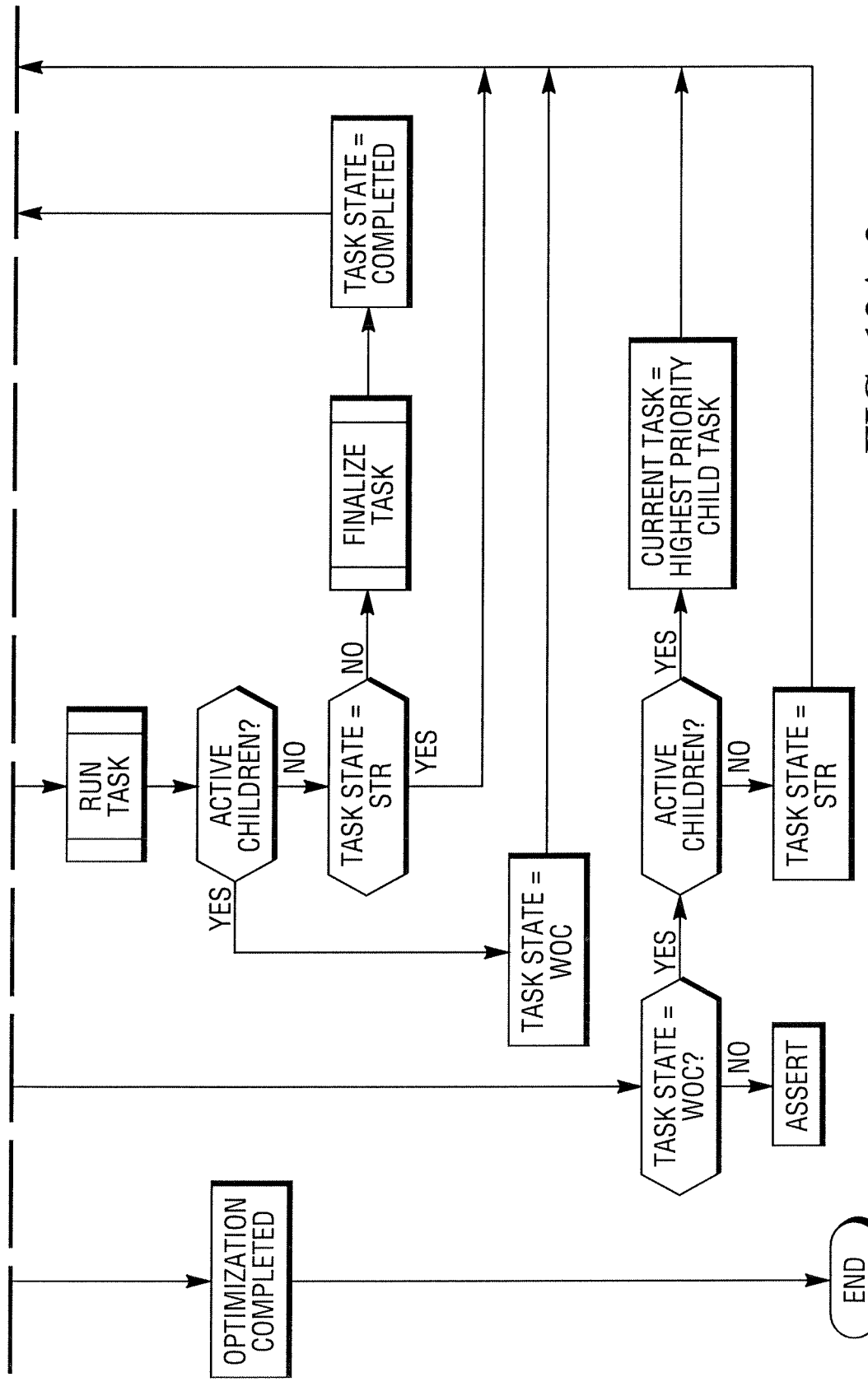

The task scheduler can responsible for orchestrating the tasks executions in an efficient and correct manner. It is also responsible for pruning tasks that do not make the priority limit set by the optimization resource controller. FIG. 12A depicts a method for task scheduling in accordance with one embodiment. Referring to FIG. 12A, the task scheduler operates the optimization engine by controlling each optimization task's operational state and invoking the code that executes each task. The operational part of each task is implemented as two methods:
  Run Task: This performs the actual query optimization, and creates any Child(ren) tasks required to optimize different parts of the query execution tree.
  Finalize Task: This performs any cleanup and reconciliation work now that all the Child(ren) tasks have finished.

The scheduler can put a task in any of the following 5 states:
  Scheduled-To-Run (STR): The task has been scheduled and waiting the scheduler to run it.
  This is the initial state of all tasks
  Running: The task is currently running (by invoking either the task's run( ) or finalize( ) methods).
  Waiting-On-Child (WOC): The task has run, scheduled one or more children tasks, and is now waiting for its children to complete.
  Completed: The task has ran; all of its children tasks have a state of either Completed or Pruned; and the task finalize( )method has been executed.
  Pruned: The task has been pruned by the scheduler based on the priority guidance.

A task starts out in the Scheduled To Run (STR) state and eventually ends up in the Completed or Pruned State. The Optimization process starts when an Optimizer Group Task on the root of the query operator tree is scheduled. As this task runs it creates child(ren) tasks which in turn, create other child(ren) tasks. The optimization process ends when the Optimize Group Task on the root reaches the Completed state.

Figure 12B:
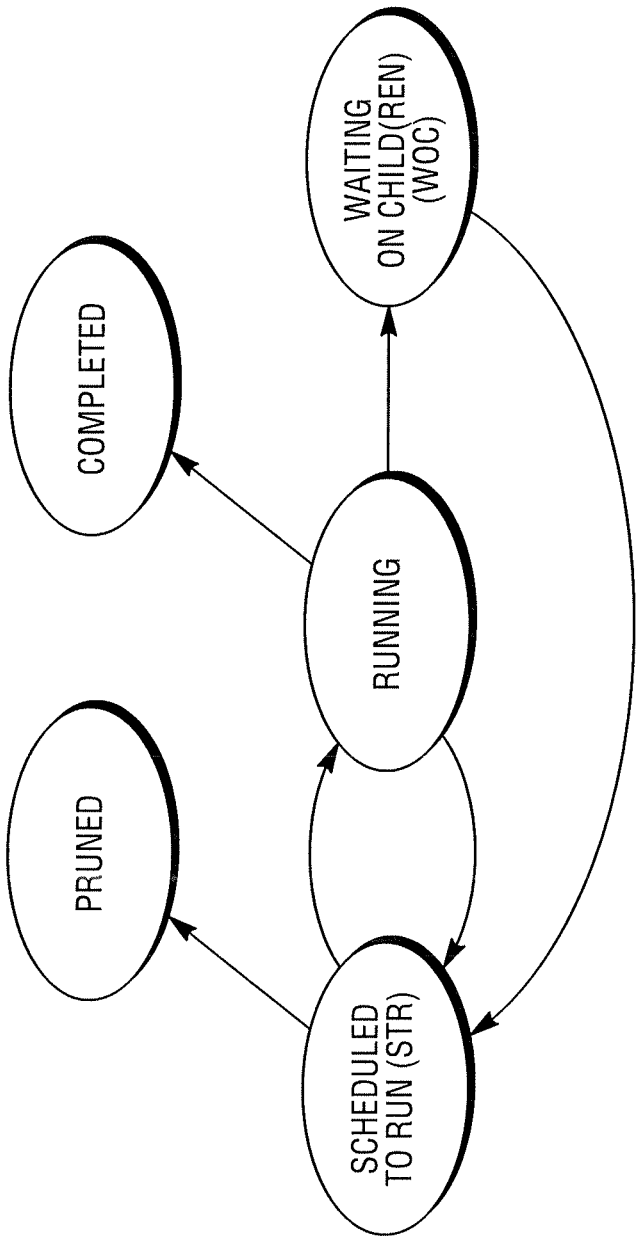
FIG. 12B depicts a state transition diagram for task scheduling in accordance with one embodiment.

Referring to FIG. 12A, the following is a description of the workflow of the task scheduler as it goes about the process of query optimization:

0. Start by creating an Optimize Group Task (OGT) that will work on the root of the query operator tree (when it runs).
   a. This task does not have a ParentTask, i.e., ParentTask for the task created in step 0 is undefined
1. The CurrentTask is set to the task created in step 0, go to step 3.
2. Set CurrentTask to ParentTask of the CurrentTask i.e. the task that created the CurrentTask
3. If CurrentTask is not defined then go to step 18
4. If CurrentTask is in the Completed state go to step 2
5. If CurrentTask is in the Pruned state go to step 2
6. If CurrentTask is in the Scheduled To Run state (STR) go to step 9
7. If CurrentTask is in the Waiting On Child(ren) state go to step 16
8. Error: Current Task is in a Bad/Undefined state, Stop
9. Check Task Priority, if task priority over threshold set CurrentTask state to Pruned and go to step 2
10. Set CurrentTask State to Running
11. Run the CurrentTask. As the CurrentTask is running it may
    a. Create New tasks and set them to be in the STR state
    b. Set its own state and change it Running->STR 12. If CurrentTask has active child(ren) (created in step 11) tasks i.e. tasks that are not Competed or Pruned then set CurrentTask state to Waiting On Child(ren) (WOC) and go to step 3
13. If CurrentTask is in the STR state go to step 3
14. Run the CurrentTask's finalization code. This may do the following
   a. Any cleanup needed before completion
   b. Anything to reconcile now that all children tasks are complete
15. Set CurrentTask state to Completed and go to step 2
16. If CurrentTask has active child(ren) tasks (created by the CurrentTask in step 11) then set CurrentTask to the Highest Priority Child Task (i.e. the task with the smallest priority number) and got to step 2
17. Set CurrentTask state STR go to step 3
18. Optimization Complete FIG. 12B depicts a state transition diagram for task scheduling (shown in FIG. 12A) in accordance with one embodiment. Referring to FIG. 12B, every task is initially created in a 'STR' state and eventually ends up either in a 'Pruned' or a 'Completed' state.

Two Pass Optimization

An optimizer can provide an effective combination of guided enumeration and selective schemes in accordance with one embodiment. In doing so, the optimizer can perform two optimization passes:

First optimization pass: In this pass the optimizer generates a small number of selected plans based on the optimization goals of minimizing the query execution data flow, utilizing indexes, and MOP execution for large operations. This is the selective scheme pass. The generated plan(s) will be inserted into the optimizer memo to be used by the next optimization pass.

Second optimization pass: This is where the bulk of optimization work occurs. In this pass the optimizer enumerates the search space exhaustively for small and medium queries and partially for highly complex queries. The optimizer uses an advanced and adaptive form of the guided enumeration approach described above. Each optimization task is assigned a priority by its parent task based on its potential for producing higher quality plans. Higher priority tasks are scheduled and performed first. As the optimization process proceeds, a search space controller keep tracks of the number of tasks performed (optimization effort) and controls the remaining effort by adjusting a priority threshold used to prune less promising tasks. The fact that higher priority tasks are performed earlier allows for the creation of more promising plans earlier in the game and hence a good plan quality when the optimization terminates. Moreover, the use of cost based pruning by the optimizer can increase the benefit of good early plans further. The early low cost plans can be used to prune more plans during the enumeration process allowing the optimizer to probe deeper into the search space and visit more potential plans, and hence higher chance of identifying better plans.

The optimizer utilizes both a heuristic based selective scheme (pass 1) and an adaptive guided enumeration scheme (pass 2). The final result is not just the cheaper plan between what could be generated by either of the two schemes alone. There are two additional advantages.

Pass 1 has the added advantage of providing good cost limit for the enumeration scheme in pass 2 which improves its result further in comparison to the case when pass 2 had been performed alone.

The optimizer memo allows for a final plan that is constructed partially from pass 1 and partially from pass 2.

Such plan will have a cost lower than that of the cheapest pass 1 or pass 2 only plans. This is one of the special advantages of the memo which allow for sharing of optimization results through the optimization process.

Figure 13:
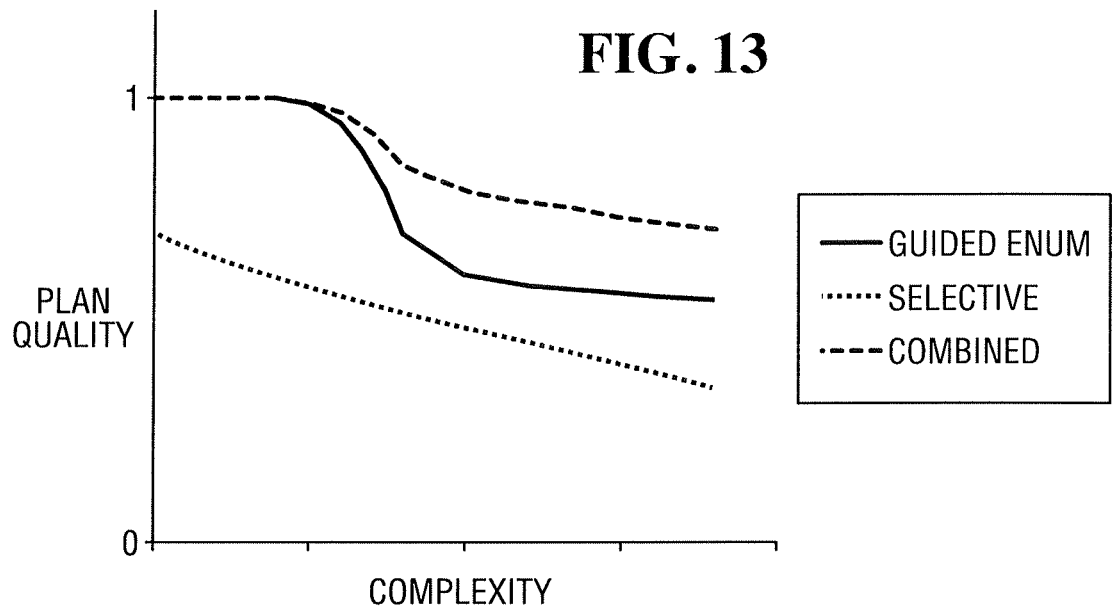
FIG. 13 depicts the result of an optimizer combination of pass 1 and pass 2 schemes (described above), utilizing the features of cost based pruning and optimizer memo to generate plans of higher quality in accordance with one embodiment.

FIG. 13 depicts the result of an optimizer combination of pass 1 and pass 2 schemes (described above), utilizing the features of cost based pruning and optimizer memo to generate plans of higher quality in accordance with one embodiment.

Multi-Platform Optimization

An optimizer runtime can involve two or more distinct execution platforms (e.g., The Intel x86 based Linux server and the Atom FPGA based hardware accelerator). In general, the operators of the query tree can be executed on either platform. However, each of the platforms has different performance characteristics and different restrictions. Furthermore, there is a cost associated with the transfer of data between the platforms.

In order to optimize the placement of operators onto the two platforms, the optimizer can perform one of more the following:
   include a required execution location in the Optimization Context so that the execution location becomes a dimension of the search space.
   enumerate different operator placements by generating all valid configurations of the Implementation (as illustrated above) based on the required execution location and on platform and operator restrictions.
   honor any restrictions on what can and cannot be executed on each platform
   take into account the execution location in the cost models of the operators
   take into account the cost of exchanging data between the platforms in the cost model of the Implementation The optimizer initializes the multi-platform optimization by creating two optimization contexts for each pass, for example, one with a required location of SOP and one with a required location of MOP. During the optimization process, the engine will initiate a call to an operators generateImplementations( ) method. This method will generate a number of possible implementations based on the required execution location of the context (and other requirements in the context). Each implementation will have a physical operator and optionally a set of post operator predicates. The implementation will also specify the execution locations of the physical operator and the predicates. The predicates can be separated into two sets, those that execute in MOP and those that execute in SOP. Based on the restrictions of the operator, it may be able to run in one of the locations. Likewise, a given predicate may be restricted to run in only one of the locations. Typically, the restrictions are such that the operator or predicate cannot run in MOP, but can run in SOP, but the reverse is sometime true. The generateImplementations( ) method will generate a set of implementations that honor the restrictions and satisfy the required execution location of the context. An implementation satisfies the execution location requirement if the output execution location is the same as the required execution location. The execution location requirement does not impose any other restriction on the implementation. For example, given an operator which can execute in either MOP or SOP and which has post operator predicates some of which can run in either MOP or SOP, but some which must run in SOP. Given an execution location requirement of MOP, an implementation will be generated.

Figure 14:
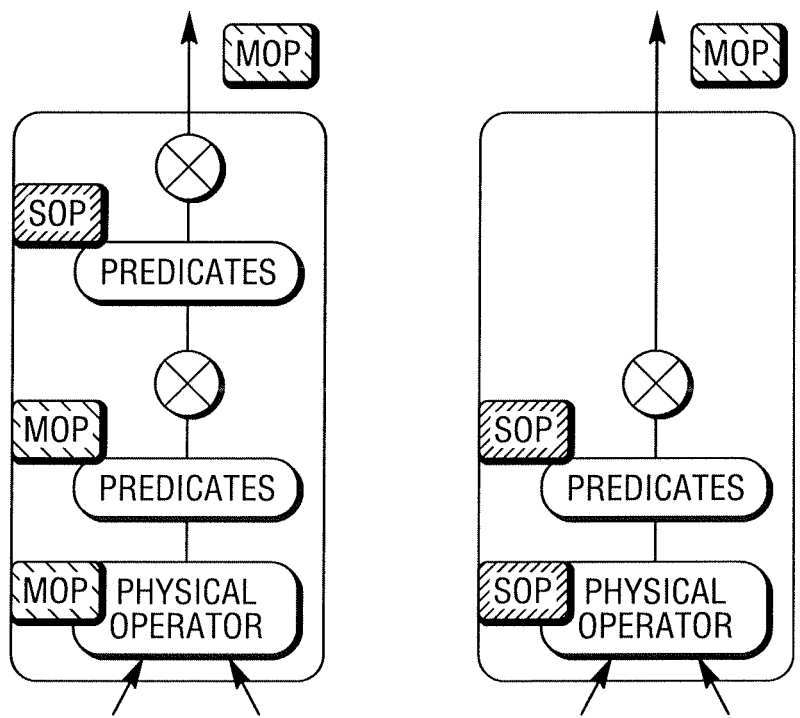
FIG. 14 depicts an implementation that can be generated in accordance with one embodiment.

FIG. 14 depicts an implementation that can be generated in accordance with one embodiment. The Implementation has all the information so that the operator cost model can take into account the execution location, and the Implementation cost model can take into account the data exchanges. The multi-platform optimization continues when the optimizer calls the generatePlans( ) method on the implementation. This method will in turn call the generatePlans( ) method on the physical c2ro_RelOper. Among other things, this method will generate a new optimization context for each child with an execution location requirement that is the same as the execution location of the operator. If the physical operator location is MOP, then the execution location requirement will be MOP for each child. Likewise, if the physical operator location is SOP, then the execution location requirement will be SOP for each child. So, in the example above, the first implementation will generate a MOP context for each of its children and the second implementation will generate a SOP context for each of its children.

It will be appreciated that the techniques described above are especially suitable for various databases, including large database systems that can typically store relatively large amount of data. Large databases can include large parallel or multiprocessing database systems that may be comprised of multiple database nodes (or nodes), where each node can have its own processor(s) and storage device(s).

Figure 15:
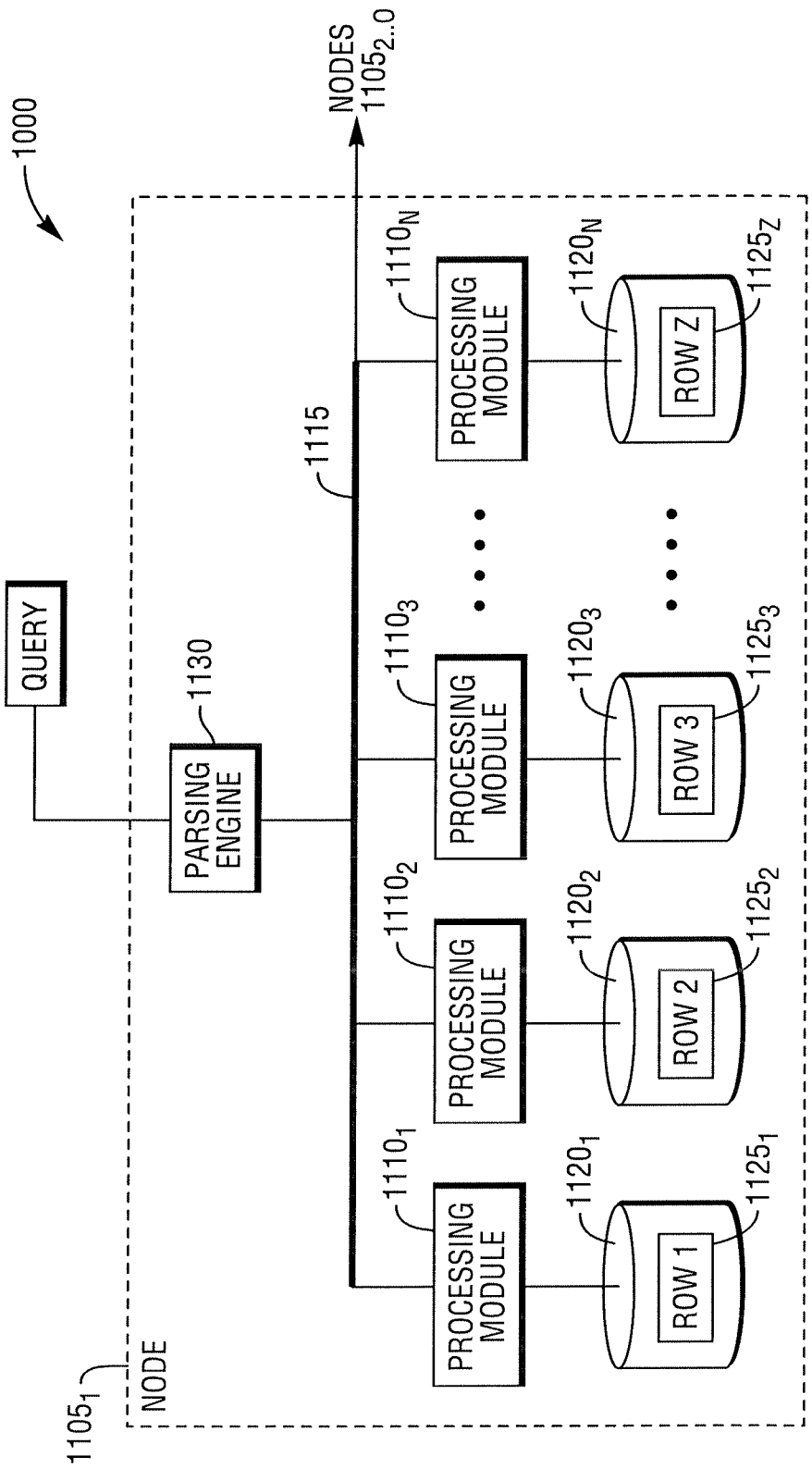
FIG. 15 depicts a database node of a database system or a Database Management System (DBMS) in accordance with one embodiment of the invention.

To further elaborate, FIG. 15 depicts a database node 1105 of a database system or a Database Management System (DBMS) 1000 in accordance with one embodiment of the invention. The DBMS 1000 can, for example, be provided as a Teradata Active Data Warehousing System. It should be noted that FIG. 6 depicts in greater detail an exemplary architecture for one database node $1105_1$ of the DBMS 1000 in accordance with one embodiment of the invention.

Referring to FIG. 15, the DBMS node $1105_1$ includes multiple processing units (or processing modules) $1110_{1-N}$ connected by a network 1115, that manage the storage and retrieval of data in data-storage facilities $1120_{1-N}$. Each of the processing units $1110_{1-N}$ can represent one or more physical processors or virtual processors, with one or more virtual processors (e.g., an Access Module Processor (AMP)) running on one or more physical processors in a Teradata Active Data Warehousing System). For example, when provided as AMPs, each AMP can receive work phases from a parsing engine (PE) 1130 which is also described below.

In the case in which one or more virtual processors are running on a single physical processor, the single physical processor swaps between the set of N virtual processors. For the case in which N virtual processors are running on an M-processor node, the node's operating system can schedule the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing units $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). Again, it should be noted that the DBMS 1000 may include additional database nodes $1105_{2-O}$ in addition to the database node $1105_1$. The additional database nodes $1105_{2-O}$ can be connected by extending the network 1115. Data can be stored in one or more tables in the data-storage facilities $1120_{1-N}$. The rows $1125_{1-Z}$ of the tables can, for example, be stored across multiple data-storage facilities $1120_{1-N}$ to ensure that workload is distributed evenly across the processing units $1110_{1-N}$. In addition, a parsing engine 1130 can organize the storage of data and the distribution of table rows $1125_{1-Z}$ among the processing units $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as, for example, SQL. Parsing engine 1130 can also handle logons, as well as parsing the SQL requests from users, turning them into a series of work phases that can be sent to be executed by the processing units $1110_{1-N}$.

For example, a client-side Host (e.g., a Personal Computer (PC), a server) can, be used to logon to the database system 1000 provided as a Teradata database server. Commination between the client-side Host and the database system 1000 can be facilitated by a database communicating mechanism, for example, by an ANSI CLI (Call Level Interface) standard that can include parcel requests and responses that facilitate the movement of data resident on the client-side host over to the database system 1000.

For example, the rows $1125_{1-Z}$ can be distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index may be called the hash function. Some portion, possibly the entirety, of the hash value can be designated a "hash bucket". As such, the hash buckets can be assigned to data-storage facilities $1120_{1-N}$ and associated processing units $1110_{1-N}$ by a hash bucket map. The characteristics of the columns chosen for the primary index determine how evenly the rows are distributed.

Figure 16:
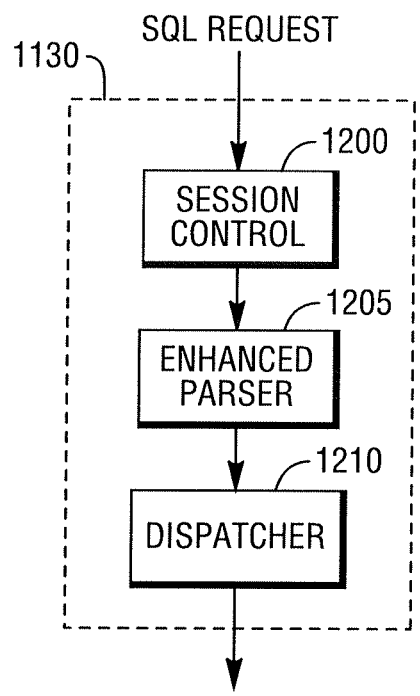
FIGS. 16 and 17 depict a parsing engine in accordance with one embodiment of the invention.

Referring now to FIG. 16, in one exemplary system, the parsing engine 1130 can be made up of three components: a session control 1200, a parser 1205, and a dispatcher 1210. In the example, the session control 1200 provides the logon and logoff function. It accepts a request for authorization to access the database, verifies it, and then either allows or disallows the access. When the session control 1200 allows a session to begin, a user may submit a SQL request, which is routed to the parser 1205. Regarding the dispatcher 1210, it should be noted that some monitoring functionality for data management and/or workload management may be performed by a regulator to monitor workloads and usage of the resources, for example, by using internal messages sent from the AMPs to the dispatcher 1210. The dispatcher 1210 can provide an internal status of every session and request running on the system, for example, by using internal messages sent from the AMPs to the dispatcher 1210. In the example, the dispatcher 1210 can provide an internal status of every session and request running on the system. As such, at least part of a database management can be provided by the dispatcher 1210 in accordance with one embodiment of the invention. The dispatcher 1210 can also operate as a workload dispatcher in order to effectively manage workloads. As such, at least part of data management system can be provided by the dispatcher 1210 in accordance with one embodiment of the invention.

Figure 17:
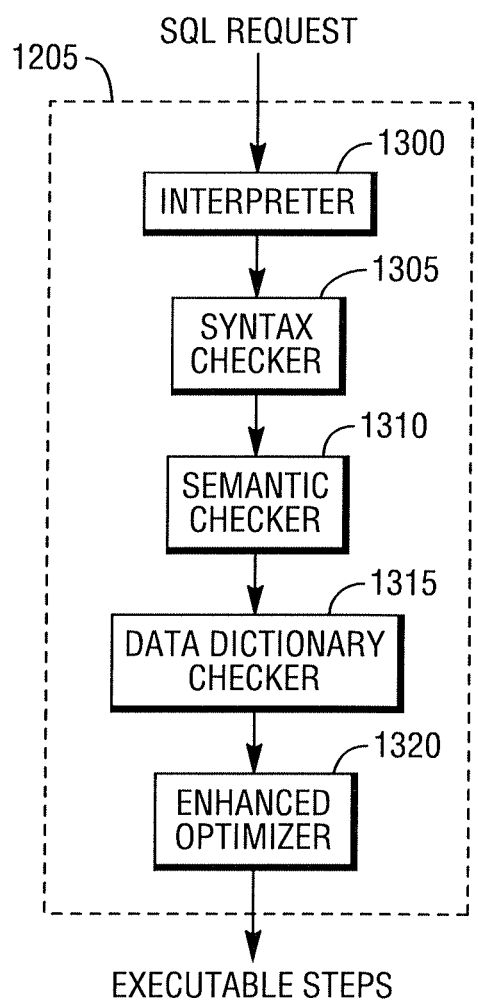

As illustrated in FIG. 17, the parser 1205 interprets the SQL request 1300, checks it for proper SQL syntax 1305, evaluates it semantically 1310, and consults a data dictionary to ensure that all of the objects specified in the SQL request actually exist and that the user has the authority to perform the request 1305. Finally, the parser 1205 runs an optimizer 1320, which can generate the least expensive plan to perform the request. The optimizer 1320 can be provided as an enhanced optimizer in accordance with one or more embodiments described above.

Additional information about databases are provided, for example, in the following U.S. patent applications and patents that are hereby incorporated by reference herein:

U.S. Pat. No. 8,244,718, Issued on Aug. 14, 2012, entitled Methods and Systems for Hardware Acceleration of Database Operations and Queries, by Joseph I. Chamdani et al.;

U.S. patent application Ser. No. 11/895,997, filed on Aug. 27, 2007, entitled Processing Elements of a Hardware Accelerated Reconfigurable Processor for Accelerating Database Operations and Queries, by Jeremy Branscome et al.;

U.S. application Ser. No. 12/098,988, Filed on Apr. 7, 2008, entitled Flexible Mechanical Packaging Form Factor for Rack Mounted Computing Devices, by Michael Corwin et al.;

U.S. patent application Ser. No. 12/099,076, filed on Apr. 7, 2008, entitled Methods and Systems for Run-Time Scheduling Database Operations that are Executed in Hardware, by Joseph Chamdani et al.;

U.S. Pat. No. 7,966,343, Issued on Jun. 21, 2011, entitled Accessing Data in a Column Store Database Based on Hardware Compatible Data Structures, by Micheal Corwin, et. al.

U.S. patent application Ser. No. 12/099,133, filed on Apr. 7, 2008, entitled Accessing Data in a Column Store Database on Hardware Compatible Indexing and Replicated Reordered Columns, by Jeremy Branscome, et al.

U.S. Pat. No. 7,895,151, Issued on Feb. 22, 2011, entitled Fast Bulk Loading and Incremental Loading of Data into a Database, by James Shau, et al.;

U.S. patent application Ser. No. 12/144,486, filed on Jun. 23, 2008, entitled Methods and Systems for Real-Time Continuous Update, by Krishnan Meiyyappan et al.;

U.S. patent application Ser. No. 12/168,821, filed on Jul. 7, 2008, entitled Methods and Systems for Generating Query Plans that are Compatible for Execution in a Hardware, James Shau et al.;

U.S. Pat. No. 8,165,988, Issued on Apr. 24, 2012, entitled Fast Bulk Loading and Incremental Loading of Data into a Database Hardware Accelerated, by James Shau, et al.;

U.S. Pat. No. 8,224,800, Issued on Jul. 17, 2012, entitled Reconfigurable Processor for Accelerating Database Operations and Queries Hardware Accelerated, by Jeremy Branscome, et al.;

U.S. Pat. No. 8,229,918, Issued on Jul. 24, 2012, entitled Reconfigurable Processor for Accelerating Database Operations and Queries Hardware Accelerated, by Jeremy Branscome, et al.;

U.S. Pat. No. 8,234,267, Issued on Jul. 31, 2012, entitled Reconfigurable Processor for Accelerating Database Operations and Queries Accessing Data in a Column, by Jeremy Branscome, et al.;

U.S. patent application Ser. No. 13/107,399, filed on May 13, 2011, entitled Store Database Based on Hardware Compatible Data Structures, by Liuxi Yang et al.;

U.S. patent application Ser. No. 13/172,790, filed on Jun. 29, 2011, entitled Methods and Systems for Hardware Acceleration of Database Operations and Queries Based on Multiple Hardware Accelerators, by Joseph Chamdani et al.;

U.S. patent application Ser. No. 13/172,792, filed on Jun. 29, 2011, entitled Methods and Systems for Hardware Acceleration of Database Operations and Queries Based on Multiple Hardware Accelerators, by Joseph Chamdani et al.;

U.S. patent application Ser. No. 13/172,798, filed on Jun. 29, 2011, entitled Methods and Systems for Dataflow Integration for Hardware Acceleration of Database Operations and Queries based on Multiple Hardware Accelerators, by Joseph Chamdani et al.;

U.S. patent application Ser. No. 13/172,799, filed on Jun. 29, 2011, entitled Methods and Systems for Hardware Acceleration of Database Operations and Queries for a Versioned Database based on Multiple Hardware Accelerators, by Joseph Chamdani et al.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of optimizing execution of one or more database queries on multiple execution platforms with one or more different characteristics and/or restrictions, wherein the computer-implemented method is implemented at least partly by one or more processors and memory configured to be accessed by the one or more processors, and wherein the computer-implemented method comprises:

storing in the memory a set of equivalent logical structures representative of multiple logical execution plans and contextual information associated with the multiple execution platforms;

processing by the one or more processors, in a top-down manner, the stored set of equivalent logical structures representative of multiple logical execution plans configured to optimize execution of the one or more database queries, based on the stored contextual information, to obtain an optimal execution plan for the execution of the one or more database queries on the multiple platforms, wherein the set of equivalent logical structures is representative of multiple execution plans for execution of the database query on the multiple execution platforms, wherein each one of the logical structures is representative of an execution plan for execution of the one or more database queries and includes one or more database logical operators, and wherein at least one of the logical operators is representative of multiple physical database operators for the execution of the database query in at least one of the multiple platforms, and wherein a plurality of optimizer tasks are maintained in an optimization task structure for scheduling such that at least one task schedules one or more other tasks as its children, recursively; and wherein during propagation of an optimization request of the database query an instance of each one of the plurality of optimizer tasks optimizer tasks, maintained in the optimization task structure for the scheduling, has one of the following states: (i) scheduled to run, (ii) running, (iii) waiting on a child, (iv) completed, and (v) pruned; and optimizing the execution of the one or more database queries on the multiple execution platforms based on the top-down processing of the set of equivalent logical structures and a multi-platform cost model that at least takes into account the respective cost of execution of set of equivalent logical structures in each one of the multiple execution platforms, thereby obtaining based on the top-down processing of the set of equivalent logical structures and the multi-platform cost model, the optimal execution plan for the execution of the one or more database queries that identifies at least a selected one of the multiple platforms as an optimal platform for execution of the optimal execution plan.

2. The method of claim 1, wherein the respective costs of execution of set of equivalent logical structures include cost associated with one or more operators for executing the one or more database queries in each one of the multiple execution platforms.

3. The method of claim 2, wherein the multi-platform cost model further takes into account the cost of execution with respect to cost of exchanging data between the multiple execution platforms.

4. The method of claim 3, wherein the method further comprises: including an execution location in an optimization goal so that the execution location becomes a dimension of search space for the optimization of the one or more database queries.

5. The method of claim 4, wherein the method further comprises: enumerating different operator placements by generating all valid configurations of implementation based on the required execution location and on each one the multiple platforms.

6. A computing system that includes one or more processors configured to:

store contextual information associated with the multiple platforms;

process a set equivalent logical structures based on the stored contextual information to obtain an optimal execution plan for the execution of a database query on at least one of the multiple platforms, wherein the set of equivalent logical structures is representative of multiple execution plans for execution the database query on the multiple platforms, wherein each one of the logical structures includes one or more logical operators, and wherein at least one of the logical operators is representative of multiple physical operators for the execution of the database query, and wherein a plurality of optimizer tasks are maintained in an optimization task structure for scheduling such that at least one task schedules one or more other tasks as its children, recursively; and wherein during propagation of an optimization request of the database query an instance of each one of the plurality of optimizer tasks optimizer tasks, maintained in the optimization task structure for the scheduling, has one of the following states: (i) Scheduled to run, (ii) running, (iii) waiting on a child, (iv) completed, and (v) pruned; and optimize the execution of the one or more database queries based on the processing of the set equivalent logical structures and a multi-platform cost model that take into account the respective cost of execution in each one of the multiple execution platforms.

7. A non-transitory computer readable storage medium that stores at least executable code that when executed:

stores contextual information associated with the multiple platforms;

processes a set equivalent logical structures based on the stored contextual information to obtain an optimal execution plan for the execution of the database query on at least one of the multiple platforms, wherein the set of equivalent logical structures is representative of multiple execution plans for execution the database query on the multiple platforms, wherein each one of the logical structures includes one or more logical operators, and wherein at least one of the logical operators is representative of multiple physical operators for the execution of the database query, and wherein a plurality of optimizer tasks are maintained in an optimization task structure for scheduling such that at least one task schedules one or more other tasks as its children, recursively; and wherein during propagation of an optimization request of the database query an instance of each one of the plurality of optimizer tasks optimizer tasks, maintained in the optimization task structure for the scheduling, has one of the following states: (i) Scheduled to run, (ii) running, (iii) waiting on a child, (iv) completed, and (v) pruned; and optimizes the execution of the one or more database queries based on the processing of the set equivalent logical structures and a multi-platform cost model that take into account the respective cost of execution in each one of the multiple execution platforms.

* * * * *